(12) United States Patent
Nace et al.

(10) Patent No.: US 11,872,683 B2
(45) Date of Patent: Jan. 16, 2024

(54) SIDE HANDLE FOR POWER TOOL

(71) Applicant: Black & Decker Inc., New Britain, CT (US)

(72) Inventors: Daniel F. Nace, Towson, MD (US); Levi G. Bowers, Manchester, MD (US); James H. Stiles, III, Baltimore, MD (US); Eric S. Rohrer, Columbia, MD (US); Christopher T. King, Catonsville, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 17/832,943

(22) Filed: Jun. 6, 2022

(65) Prior Publication Data

US 2022/0388142 A1 Dec. 8, 2022

Related U.S. Application Data

(60) Provisional application No. 63/222,816, filed on Jul. 16, 2021, provisional application No. 63/197,714, filed on Jun. 7, 2021.

(51) Int. Cl.
*B25F 5/00* (2006.01)
*B25F 5/02* (2006.01)
(Continued)

(52) U.S. Cl.
CPC ............ *B25F 5/026* (2013.01); *B24B 23/028* (2013.01); *B25F 5/001* (2013.01); *B25F 5/02* (2013.01); *H01H 13/14* (2013.01); *H02P 1/06* (2013.01)

(58) Field of Classification Search
CPC ...................................................... B25F 5/026
See application file for complete search history.

(56) References Cited

U.S. PATENT DOCUMENTS

| 4,891,915 A | 1/1990 | Yasuda |
| 5,558,570 A | 9/1996 | Nakamura et al. |

(Continued)

FOREIGN PATENT DOCUMENTS

| CN | 2825226 Y | 10/2006 |
| CN | 206296766 U | 7/2017 |

(Continued)

OTHER PUBLICATIONS

EP EESR dated, Nov. 9, 2022 in corresponding EP application No. 22177359.1.

(Continued)

*Primary Examiner* — Eyamindae C Jallow
(74) *Attorney, Agent, or Firm* — Amir R. Rohani

(57) ABSTRACT

A side handle for a power tool is provided including a main gripping body; a rod extending through the main gripping body and having a threaded end extending through a frontal end of the main gripping body; and a knob mounted on an end of the rod opposite the threaded end and being rotatable relative to the main gripping body. The frontal end of the main gripping body includes a keying feature operable to engage a portion of the power tool to prevent rotation of the main gripping body relative to the power tool while the knob is rotated to fasten the threaded end of the rod to a threaded opening of the power tool.

19 Claims, 25 Drawing Sheets

(51) Int. Cl.
  *B24B 23/02* (2006.01)
  *H02P 1/06* (2006.01)
  *H01H 13/14* (2006.01)

(56) References Cited

U.S. PATENT DOCUMENTS

| | | | |
|---|---|---|---|
| 6,511,200 | B2 | 1/2003 | Matsunaga |
| 6,799,643 | B2 | 10/2004 | Voulkidis et al. |
| 7,418,892 | B2 | 9/2008 | Taylor |
| 7,628,219 | B2 | 12/2009 | Frauhammer et al. |
| 7,658,237 | B2 | 2/2010 | Rudolf et al. |
| 7,868,263 | B2 | 1/2011 | Hammerstingl et al. |
| 8,032,990 | B2 | 10/2011 | Shinma et al. |
| 8,186,018 | B2 | 5/2012 | Martin |
| 8,240,395 | B2 | 8/2012 | Kamegai et al. |
| 10,682,753 | B2 | 6/2020 | Numata |
| 11,260,502 | B2 | 3/2022 | Schadow et al. |
| 2008/0078067 | A1* | 4/2008 | Nicolantonio .......... B25F 5/026 16/110.1 |
| 2009/0038121 | A1 | 2/2009 | Eicher et al. |
| 2010/0089727 | A1 | 4/2010 | Schmid |
| 2012/0211250 | A1 | 8/2012 | Yamauchi |
| 2014/0231113 | A1 | 8/2014 | Steurer |
| 2014/0326476 | A1 | 11/2014 | Limberg et al. |
| 2018/0326554 | A1 | 11/2018 | Schadow et al. |
| 2019/0030622 | A1* | 1/2019 | Carlson .................. B23B 45/00 |
| 2020/0384597 | A1* | 12/2020 | Numata .................. B25F 5/026 |
| 2020/0384627 | A1* | 12/2020 | Numata ................. B24B 23/005 |
| 2021/0100170 | A1* | 4/2021 | Suzuki .................... B25F 5/026 |

FOREIGN PATENT DOCUMENTS

| | | |
|---|---|---|
| CN | 208322987 U | 1/2019 |
| CN | 110228043 A | 9/2019 |
| CN | 210360762 U | 4/2020 |
| CN | 211305868 U | 8/2020 |
| DE | 19507955 A1 | 9/1996 |
| DE | 102004007764 B3 | 9/2005 |
| DE | 10117835 B4 | 1/2008 |
| DE | 202007012394 U1 | 1/2008 |
| DE | 102007059412 A1 | 6/2009 |
| DE | 102011089673 A1 | 6/2013 |
| DE | 102012208885 A1 | 11/2013 |
| DE | 102013213284 A1 | 2/2014 |
| DE | 202014105072 U1 | 1/2015 |
| DE | 202009019169 U1 | 7/2017 |
| DE | 202018102559 U1 | 5/2018 |
| DE | 102005063017 B4 | 5/2019 |
| DE | 102018108068 A1 | 10/2019 |
| EP | 1172181 A1 | 1/2002 |
| EP | 1504656 B1 | 5/2006 |
| EP | 1504657 B1 | 9/2006 |
| EP | 1504658 B1 | 10/2006 |
| EP | 1563962 B1 | 5/2008 |
| EP | 1952926 A2 | 8/2008 |
| EP | 1867443 B1 | 7/2009 |
| EP | 2237925 | 7/2009 |
| EP | 1400319 B1 | 8/2009 |
| EP | 2079630 B1 | 3/2010 |
| EP | 1125698 B1 | 6/2012 |
| EP | 2944430 B1 | 9/2016 |
| EP | 2732914 B1 | 1/2017 |
| EP | 2412483 B1 | 2/2017 |
| EP | 1889692 B1 | 6/2017 |
| EP | 2855097 B1 | 8/2017 |
| EP | 2371492 B1 | 9/2017 |
| EP | 3427899 A1 | 1/2019 |
| EP | 3348357 B1 | 1/2020 |
| EP | 3199017 B1 | 5/2020 |
| EP | 3663050 A1 | 6/2020 |
| EP | 2647473 B1 | 7/2020 |
| GB | 2444160 B | 11/2009 |
| GB | 2461992 B | 8/2012 |
| GB | 2598736 A | 3/2022 |
| JP | H08336779 A | 12/1996 |
| JP | 2006142425 A | 6/2006 |
| WO | 2008009624 A1 | 1/2008 |
| WO | 2017051892 A1 | 3/2017 |
| WO | 2019136875 A1 | 7/2019 |
| WO | 2020241086 A1 | 12/2020 |
| WO | WO-2021192850 A1 * | 9/2021 |

OTHER PUBLICATIONS

EP EESR dated, Nov. 8, 2022 in corresponding EP application No. 22177365.8.

* cited by examiner

SIDE HANDLE FOR POWER TOOL

FIELD OF THE DISCLOSURE

This patent application claims the benefit of U.S. Provisional Application No. 63/197,714, filed Jun. 7, 2021, and U.S. Provisional Application No. 63/222,816, filed Jul. 16, 2021, both of which are incorporated herein by reference in their entireties.

FIELD OF THE DISCLOSURE

This disclosure relates to a side handle, and in particular to a side handle for a power tool such as a grinder.

BACKGROUND

Various electric power tools are provided with handles for added user safety and stability. High power drills and hammer drills, for example, are provide with side handles including a clamping mechanism mounted around the transmission case to allow the user to operate the tool with two hands—one hand on the main handle of the tool engaging the trigger switch, and the second hand on the side handle to stabilize and apply added force to the tool. Metalworking power tools such as grinders similarly utilize side handles mounted on the tool.

A problem that arises is even when the side handle is mounted on the tool, the user may still opt to operate the tool without it. What is needed, and is proposed in this disclosure, is methods and mechanisms for sensing that the side handle is not just mounted, but it is also properly gripped by the user.

SUMMARY

A side handle for a power tool is provided including a main gripping body; a rod extending through the main gripping body and having a threaded end extending through a frontal end of the main gripping body; and a knob mounted on an end of the rod opposite the threaded end and being rotatable relative to the main gripping body. In an embodiment, the frontal end of the main gripping body includes a keying feature operable to engage a portion of the power tool to prevent rotation of the main gripping body relative to the power tool while the knob is rotated to fasten the threaded end of the rod to a threaded opening of the power tool.

In an embodiment, the keying feature includes a notch projecting adjacent the threaded end of the rod.

In an embodiment, a trigger switch is located on the main gripping body.

In an embodiment, the trigger switch is located forward of the main gripping body as the side handle is fastened onto the power tool.

In an embodiment, a plunger is coupled to the trigger switch, where the plunger is configured to selectively engage a switch located on the power tool when the trigger switch is pressed.

In an embodiment, an electronic switch is located within the main gripping body, the electronic switch being selectively engaged when the trigger switch is pressed, and the electronic switch transmits a signal to the power tool.

According to another embodiment of the invention, a side handle for a power tool is provided including a main gripping body; a mounting member disposed on one end of the main gripping body and being rotatable relative to the main gripping body; and a rod extending through the main gripping body and the mounting member, the rod having a threaded end extending through the mounting member. In an embodiment, the mounting member includes a keying feature operable to engage a portion of the power tool to prevent rotation of the mounting member relative to the power tool while the main gripping body is rotated relative to the mounting member.

In an embodiment, a knob is mounted on an end of the rod opposite the threaded end and being rotatable relative to the main gripping body, the knob being operable to be rotated to fasten the threaded end of the rod to a threaded opening of the power tool.

In an embodiment, the main gripping body is rotatable relative to the mounting member within first axial travel distance of the rod, but it is locked relative to the mounting member within a second axial travel distance of the rod.

In an embodiment, a locking interface is disposed between the mounting member and the main gripping body.

In an embodiment, the locking interface includes teeth disposed on the main gripping body and corresponding pockets disposed on the mounting member.

In an embodiment, a trigger switch is located on the main gripping body, and the locking interface is configured to rotationally lock the main gripping body relative to the mounting member so as to fix an angular orientation of the trigger switch relative to the side handle.

According to another embodiment of the invention, a power tool is provided including a housing having a handle portion, a battery portion provided on a foot of the handle portion for receiving a removeable battery pack, and a motor housing portion extending from the handle portion opposite the battery portion. The power tool further includes an electric motor disposed within the motor housing; and a gear case that receives an output shaft of the motor from the motor housing. In an embodiment, the gear case includes at least one threaded opening disposed through a side wall of the gear case and configured to receive a threaded end of a side handle, and a keying feature disposed adjacent the threaded opening on the side wall of the gear case and configured to engage a portion of the side handle to prevent rotation of at least frontal portion of the side handle relative to the gear case as the threaded end of the side handle is being rotationally fastened into the threaded opening.

In an embodiment, the keying feature includes two planar tabs projecting front the gear case proximate the threaded opening and the portion of the side handle includes a notch projecting from the frontal end of the side handle, the two planar tabs being positioned to receive the notch therein.

In an embodiment, the gear case further includes a pin hole disposed adjacent the threaded opening, where an electronic switch is mounted inside the gear case in line with the pin hole, and the pin hole is positioned to receive a plunger of the side handle configured to selectively contact with electronic switch.

In an embodiment, the keying feature includes an opening through which a first connector is disposed, where an electronic switch is mounted inside the side handle and is coupled to a second connector mounted on the front end of the side handle, and the second connector is connectable to the first connector.

According to another embodiment of the invention, a side handle for a power tool is provided including a main gripping body; a rod extending through the main gripping body and having a threaded end extending through a frontal end of the main gripping body; a trigger switch pivotably mounted on the gripping body; a spring disposed within the main gripping body to bias the trigger switch away from the main gripping body; and a feedback mechanism configured to engage the spring to provide a tactile and/or audible feedback to the user upon at least one of actuation or release of the trigger switch.

In an embodiment, the feedback mechanism includes a ramped surface arranged to move an end of the spring away from an inner surface of the main gripping body.

In an embodiment, wherein the feedback mechanism further includes a channel having a lip extending parallel to the inner surface of the main gripping body, wherein the end of the spring snaps inside the channel when the trigger switch is actuated to a predetermined actuation position.

In an embodiment, the feedback mechanism further includes a chamfer that releases the end of the spring from engagement with the lip when the trigger switch is depressed to a predetermined release position.

In an embodiment, the side handle further includes a plunger coupled to the trigger switch and an electronic switch engageable by the plunger when the trigger switch is engaged to a predetermined actuation position.

In an embodiment, the side handle further includes a plunger coupled to the trigger switch and extending substantially parallel to the rod, wherein an end of the plunger is operable to selectively engage an electronic switch disposed within the power tool.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several figures of the drawings.

DETAILED DESCRIPTION

Figure 1:
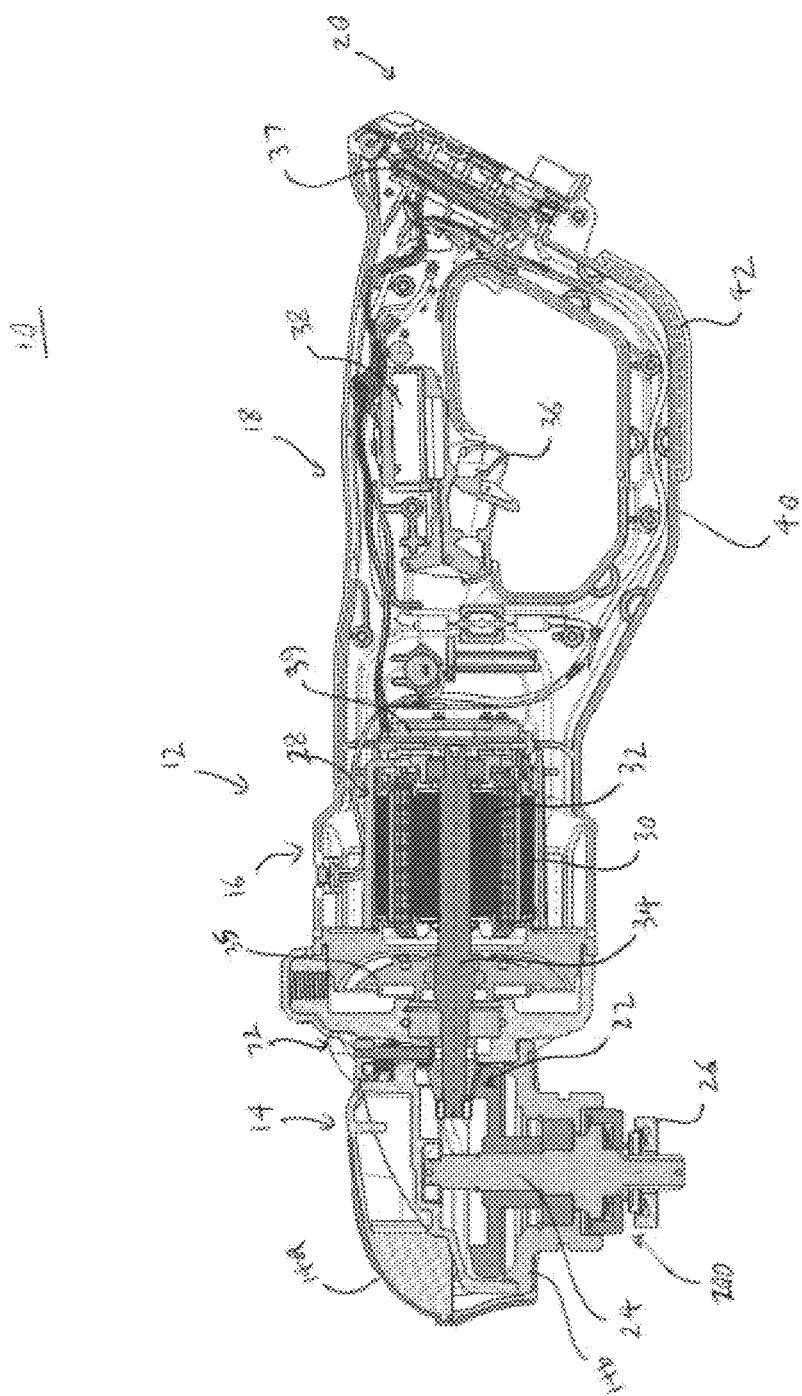
FIG. 1 is a side cross-sectional view of a power tool, according to an embodiment.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

FIG. 1 is a side cross-sectional view of a power tool 10, according to an embodiment. In an embodiment, power tool 10 is provided including a housing 12 having a gear case 14, a motor case 16, a handle portion 18, and a battery receiver 20. Power tool 10 as shown herein is an angle grinder with the gear case 14 housing a gearset 22 that drives an output spindle 24 arranged to be coupled to a grinding or cutting disc (not shown, herein referred to as "accessory wheel"), either via threads on the disc, or via a flange (or threaded nut) 26 and guarded by a disc guard (not shown). It should be understood, however, that the teachings of this disclosure may apply to any other power tool including, but not limited to, a saw, drill, sander, and the like. Gearset 22 may include operate the output spindle 24 at a 90-degree angle orientation or in a linear orientation. In an embodiment, gear case 14 includes an upper gear case cover 14a and a lower gear case cover 14b that cooperative house the gearset 22 components.

In an embodiment, the motor case 16 attaches to a rear end of the gear case 14 and houses a motor 28 operatively connected to the gear set 22. An intermediary plate or baffle may be disposed between the motor case 16 and the rear end of the gear case 14. In an embodiment, the motor 28 is a brushless direct-current (BLDC) motor having a stator 30 and a rotor 32 rotatable relative to the stator 30. The rotor 32 is mounted on a rotor shaft 34 that rotatably drives the output spindle 24 via the gearset 22. A fan 35 is mounted on the rotor shaft 34 between the motor 28 and the gear case 14, facing the intermediary plate or baffle, to generate an airflow for cooing the motor 28 and other components. The airflow generated by the fan 35 exists through an air exhaust vent 72 provided on the motor case 16 and/or the gear case 14.

In an embodiment, the handle portion 18 extends from a rear end of the motor case 16 and includes a trigger assembly 36 operatively connected to a control module 38 disposed within the handle portion 18 for controlling the operation of the motor 28. The battery receiver 20 is provided at a rear end of the handle portion 18 for detachable engagement with a battery pack (not shown) to provide power to the motor 28.

In an embodiment, a second handle 40 is provided that extends from the rear end of the motor case 16 to the battery receiver 20, at least partially in parallel to the handle portion 18. In an embodiment, second handle 40 is a D-handle designed to enhance structural support for the handle portion 18 and the battery pack and improve drop performance of the power tool 10. In an embodiment, second handle 40 is provided with a bumper 42 arranged to absorb shock during drop or impact. In an embodiment, bumper 42 is made of an overmold material.

In an exemplary embodiment, the battery pack may be a 60-volt max lithium-ion type battery pack, although battery packs with other battery chemistries, shapes, voltage levels, etc. may be used in other embodiments. In various embodiments, the battery receiver 20 and battery pack may be a sliding pack disclosed in U.S. Pat. No. 8,573,324, hereby incorporated by reference. However, any suitable battery receiver and battery back configuration, such as a tower pack or a convertible 20V/60V battery pack as disclosed in U.S. patent application Ser. No. 14/715,258 filed May 18, 2015, also incorporated by reference, can be used. The present embodiment is disclosed as a cordless, battery-powered tool. However, in alternate embodiments power tool can be corded, AC-powered tools. For instance, in place of the battery receiver and battery pack, the power tool 10 include an AC power cord coupled to a transformer block to condition and transform the AC power for use by the components of the power tools. Power tool 10 may for example include a rectifier circuit adapted to generate a positive current waveform from the AC power line. An example of such a tool and circuit may be found in US Patent Publication No. 2015/0111480, filed Oct. 18, 2013, which is incorporated herein by reference in its entirety.

In an embodiment, the control module 38 is electronically coupled to a power module that is provided as a part of the same package as the control module 38 or is disposed at a different location of the power tool, for example adjacent the motor 28, to deliver power to the motor 28. In an embodiment, the power module includes six power switches (e.g., FETs or IGBTs) configured as a three-phase inverter switch. The control module 38 controls a switching operation of the power module to regulate a supply of power from the battery pack to the motor 28. The control module 38 uses the input from the trigger assembly 36 to set a target speed for the motor 28. When the trigger assembly 36 is released, in an embodiment, the control module 38 activates the low-side switches or the high-side switches of the power module simultaneously for regenerative electronic braking of the motor. A description of the power and control modules and electronic braking of the motor can be found in US Patent Publication No. 2017/0234484, filed Feb. 10, 2017, which is incorporated herein by reference in its entirety.

Figure 2:
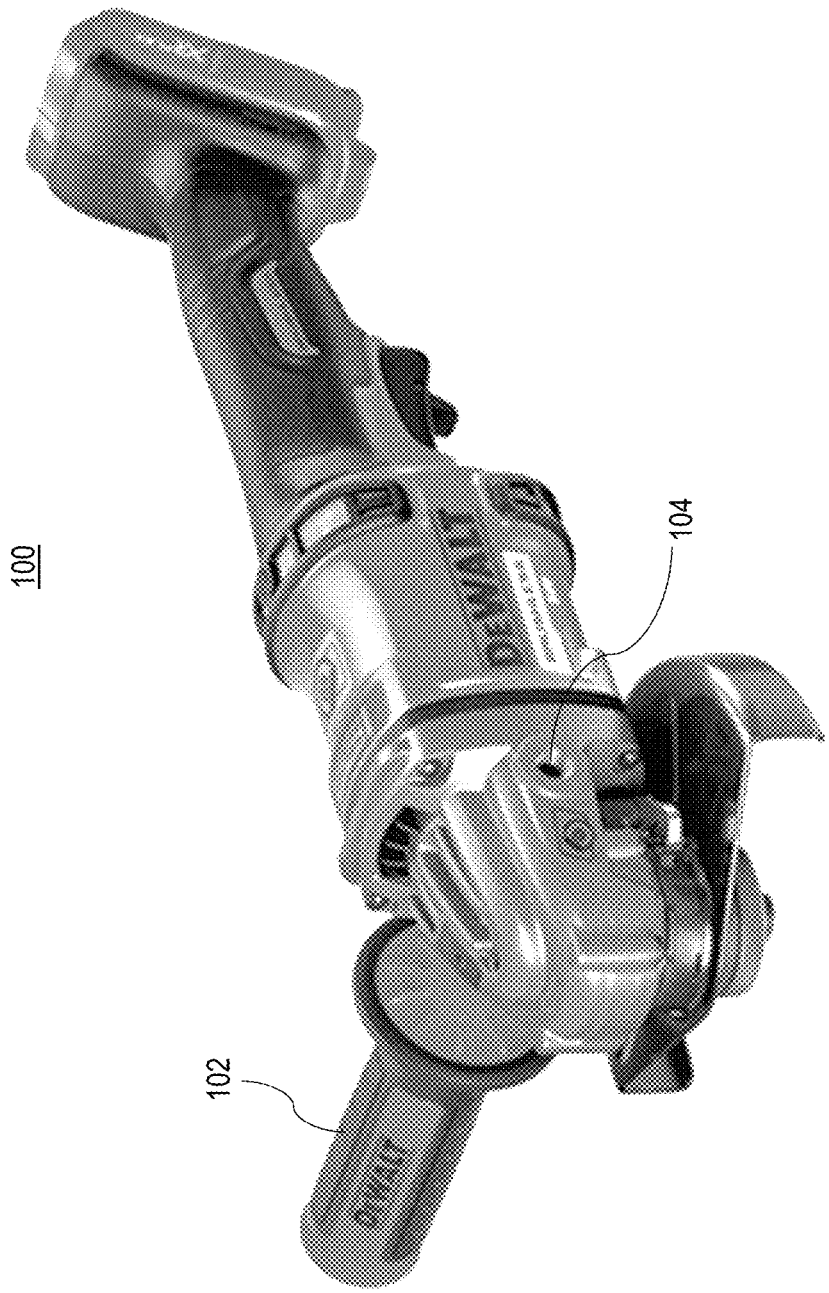
FIG. 2 depicts a conventional grinder and side handle arrangement, according to an embodiment.

FIG. 2 depicts a conventional grinder 100 and side handle 102 arrangement, according to an embodiment. Traditionally, a grinder has one or more mounting locations in the form of threaded openings 104 for attachment of the removeable side handle 120. This allows the grinder 100 to be operated safely in multiple configurations in an ambidextrous manner. A problem experienced by many users is that the side handle 102 threads wear over time owing the forced applied by the user in the course of operating the tool, causing the side handle 102 to become loose and unstable. This can potentially cause loss of control and concentration and should preferably be avoided.

To overcome this problem, according to an embodiment, the grinder mounting location provided for mounting of side handles is keyed to prevent rotation of the side handle relative to the grinder. Furthermore, the side handle is designed such that the main body of the side handle is not required to rotate relative to the grinder to mount the side handle. Rather, a rotatable knob is provided on the side handle that is used to tighten the side handle to the mounting location of the grinder without rotating the main body of the side handle.

Figure 3:
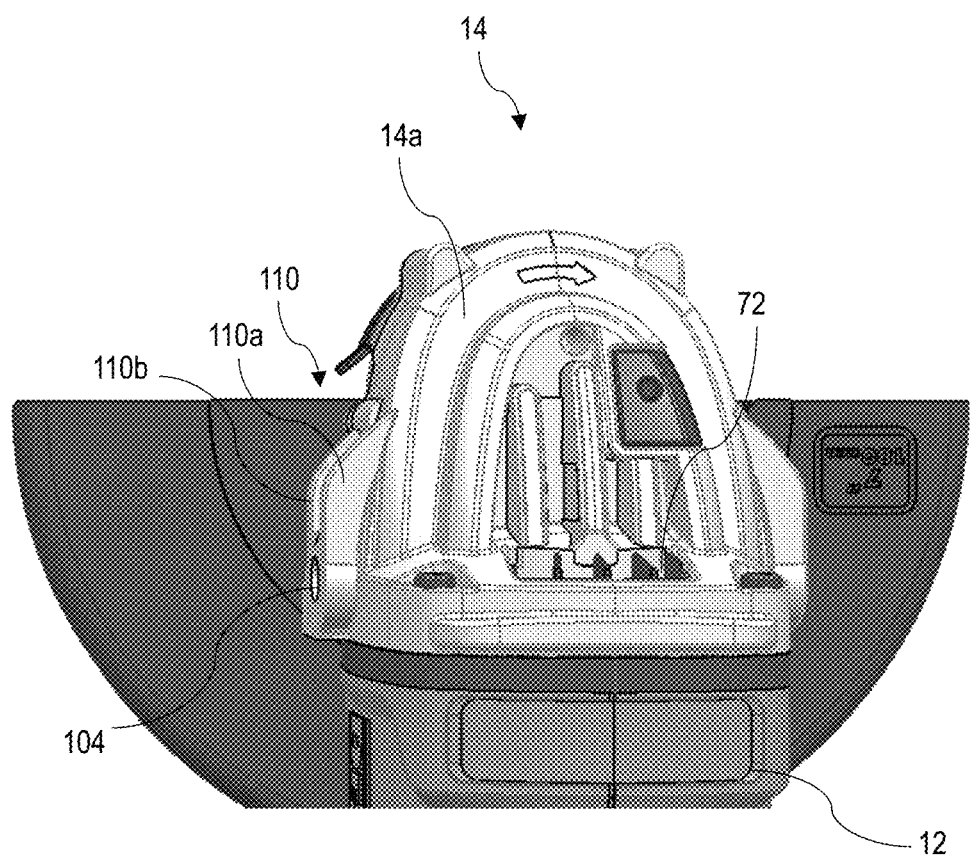
FIG. 3 depicts a perspective partial view of a grinder provided with a keying feature for preventing the rotation of a side handle, according to an embodiment.

FIG. 3 depicts a perspective partial view of grinder 10 provided with a keying feature 110 for preventing the rotation of a side handle, according to an embodiment. In this embodiment, keying feature 110 includes two planar tabs 110a and 110b that project laterally from upper gear case cover 14a of the gear case 14 adjacent threaded opening 104. The two planar tabs 110a and 110b are provided at a distance from one another, extending in parallel axially in the forward direction of the threaded opening 104 to define an open gap therebetween forward of the threaded opening 104. In an embodiment, planar tabs 110a and 110b extend approximately 4 to 8 mm in the lateral direction from the gear case cover 14a.

Figure 4:
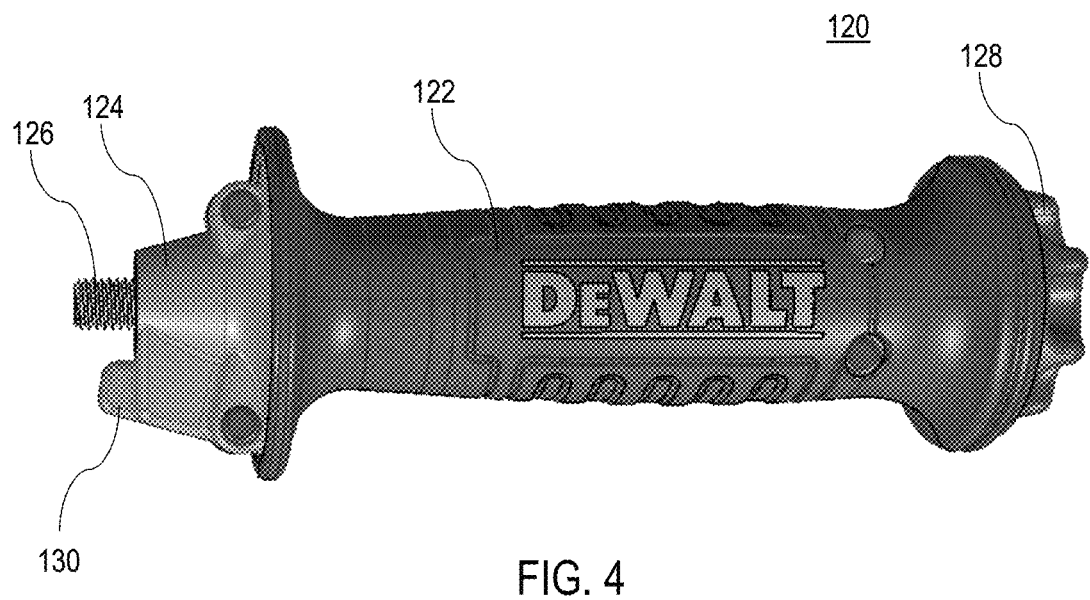
FIGS. 4 and 5 depict side and perspective views of a side handle configured to be mounted on the grinder, including a notch that engages the keying feature, according to an embodiment.
Figure 5:
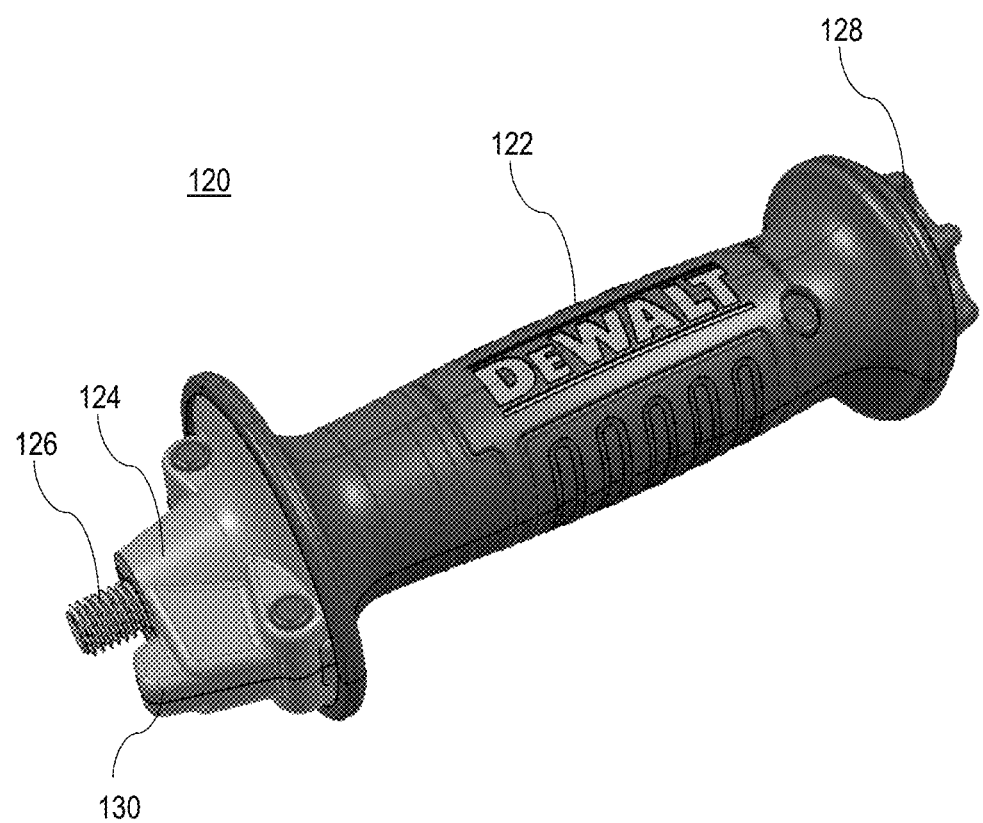
Figure 6:
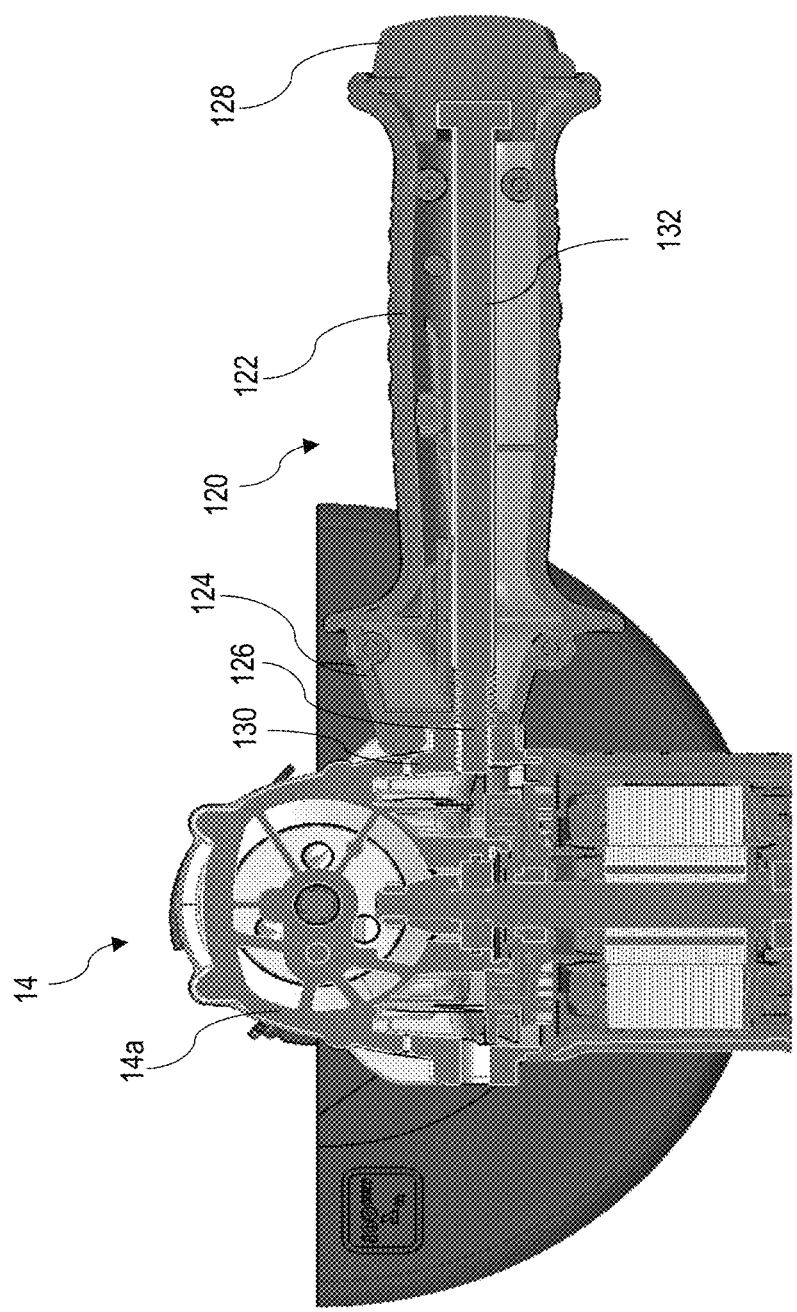
FIG. 6 depicts a top cross-sectional view of the grinder with the side handle mounted, according to an embodiment.
Figure 7:
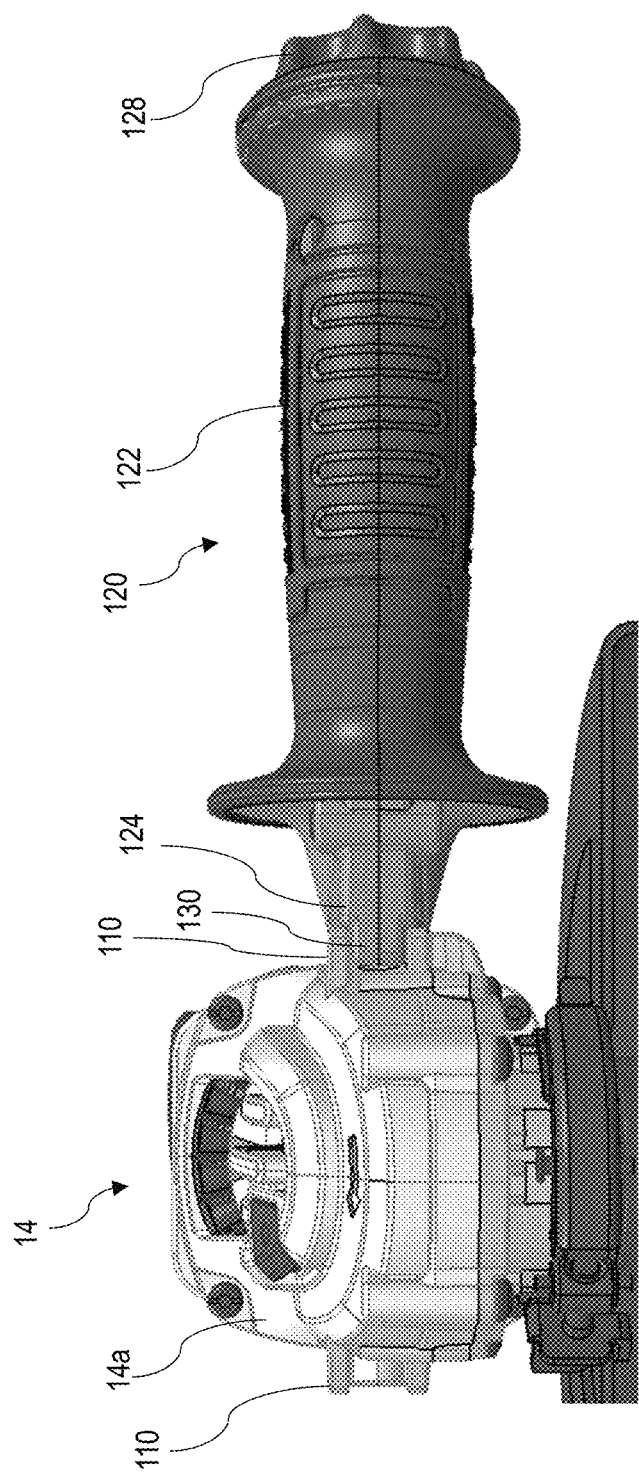
FIG. 7 depicts a perspective view of the grinder with the side handle mounted, according to an embodiment.

FIGS. 4 and 5 depict side and perspective views of a side handle 120 configured to be mounted on the grinder 10, according to an embodiment. FIG. 6 depicts a top cross-sectional view of the grinder 10 with the side handle 120 mounted, according to an embodiment. FIG. 7 depicts a perspective view of the grinder 10 with the side handle 120 mounted, according to an embodiment.

In an embodiment, side handle 120 includes a main gripping body 122 having a frontal end 124 through which a treaded end 126 of a rod extends. A knob 128 is mounted on the other end of the main gripping body 122 opposite the frontal end 124. A notch 130 projects from the frontal end 124.

In an embodiment, the notch 130 is sized to be fittingly received within the gap between the planar tabs 110*a* and 110*b* of the keying feature 110. This arrangement ensures that the main gripping body 122 is substantially non-rotatable relative to the grinder 10. Rod 132 extends through the main gripping body 122 and is fixedly coupled to the knob 128. While the main gripping body 122 is non-rotatably held relative to the grinder 10 via the notch 130, the knob 128 and the rod 132 are rotatable relative to the main gripping body 122, allowing the threaded end 126 of the rod 132 to fastened into the threaded opening 104 of the grinder 10. This arrangement ensures that any force applied by the user to the side handle 120 during normal operation of the grinder 10 does not cause further rotation of the side handle 120, causing the threaded end 126 of the rod 132 to wear and loosen over time.

Figure 8:
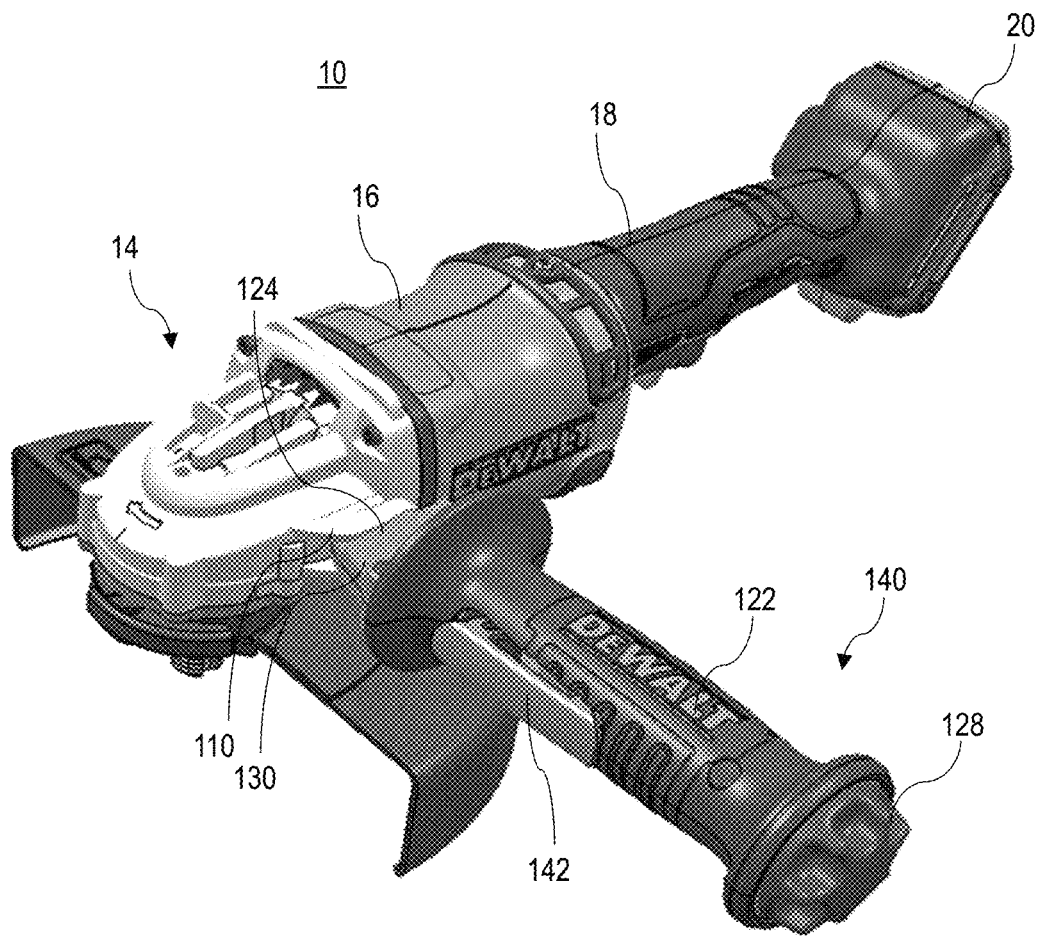
FIG. 8 depicts a perspective view of the grinder and a side handle provided with a trigger switch, according to a further and/or alternative embodiment.
Figure 9:
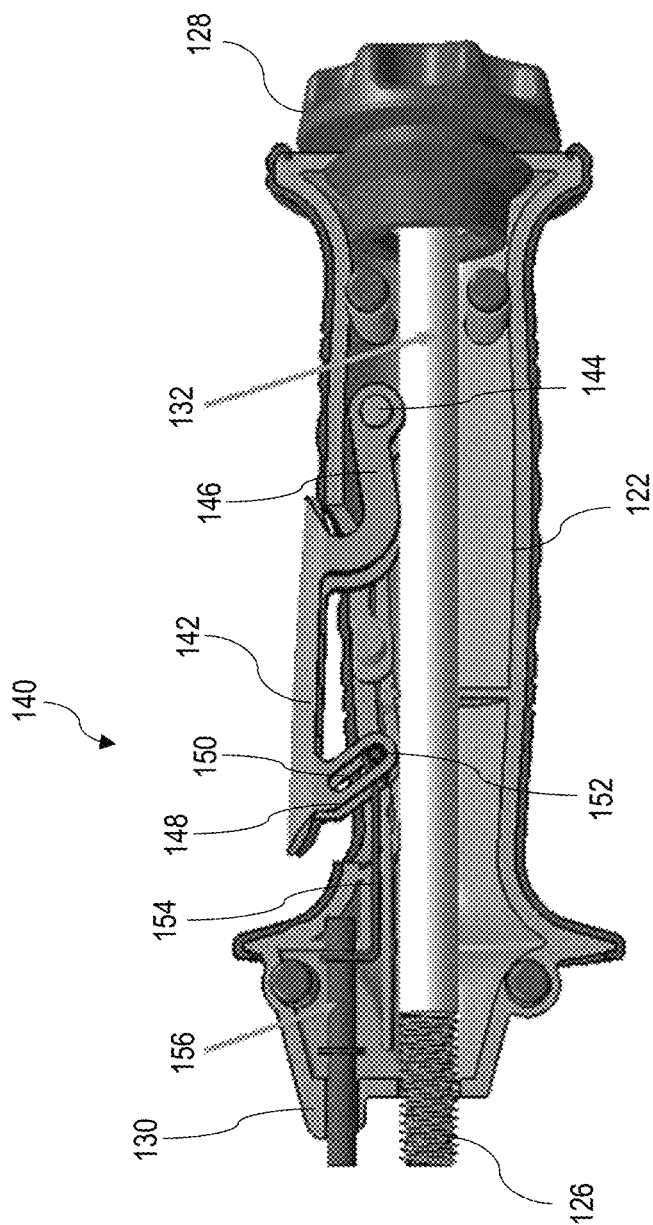
FIG. 9 depicts a side view of the side handle with the trigger switch, according to an embodiment.

FIG. 8 depicts a perspective view of the grinder 10 and a side handle 140 further provided with a trigger switch 142, according to a further and/or alternative embodiment. FIG. 9 depicts a side view of the side handle 140, according to an embodiment. In this embodiment, to the extent that side handle 140 includes the same features described above, the same reference numerals are used. In an embodiment, trigger switch 142 is actuatable by the user when the user's hand is on the main gripping body 122 of the side handle 140. In an embodiment, the grinder 10 is configured to energize the motor 28 only if the trigger switch 142 is pressed by the user. The non-rotatable configuration of the main gripping body 122 ensures that the trigger switch 142 is always forward of the main gripping body 122 along the axial direction of the grinder 10.

In an embodiment, side handle 140 is provided with a pivot pin 144 that supports an end of first legs 146 the trigger switch 142 relative to the main gripping body 122. Pressing the trigger switch 142 relative the main gripping body 122 causes rotation of the main gripping body 122 around the pivot pin 144, moving second legs 148 of the trigger switch 142 into main gripping body 122 partially along two sides of the rod 132. The second legs 148 include elongated apertures 150 that extends at approximately a 40 to 60 degree angle relative to the axis of the rod 132 and together support a laterally-oriented bar 152. The bar 152 is in turn coupled, via a link member 154, to a plunger 156 that extends in parallel to the rod 132. The plunger 156 extends adjacent the threaded end 126 through the notch 130 at a distance of approximately 4 mm to 14 mm from the rod 132. The angular orientation of the elongated apertures 150 causes the link member 154, and therefore the plunger 156, to move forward (i.e., in the direction of the grinder 10) as the trigger switch 142 is pressed. A spring member (not shown) biases the plunger 156 in the rearward direction away from grinder 10. Alternatively, the spring member may be provided to bias the trigger switch 142 away from the main gripping body 122.

Figure 10:
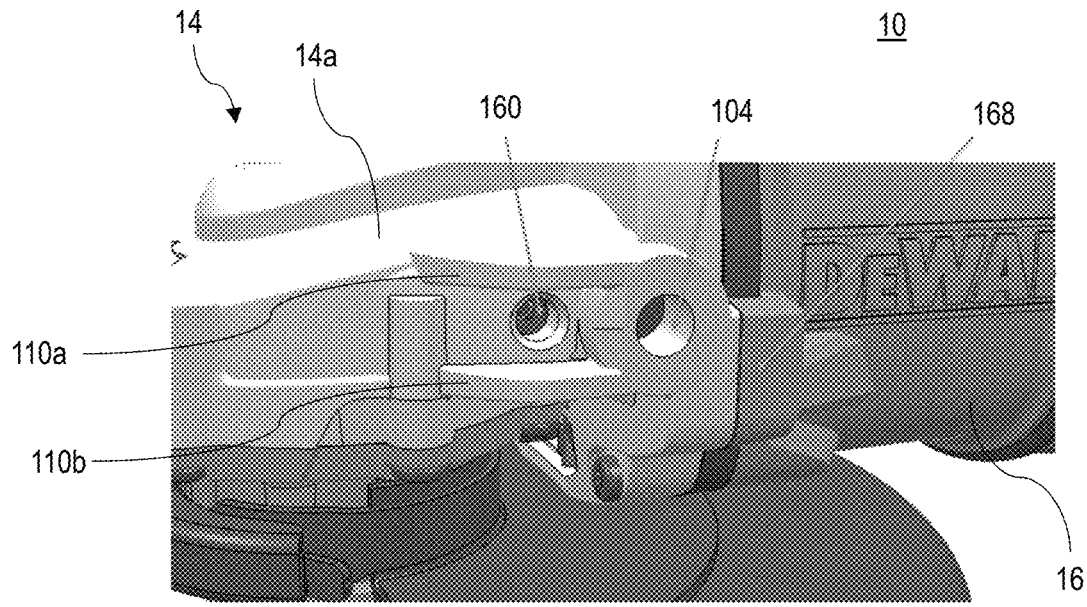
FIG. 10 depicts a perspective view of the grinder provided with plunger pin holes, according to an embodiment.
Figure 11:
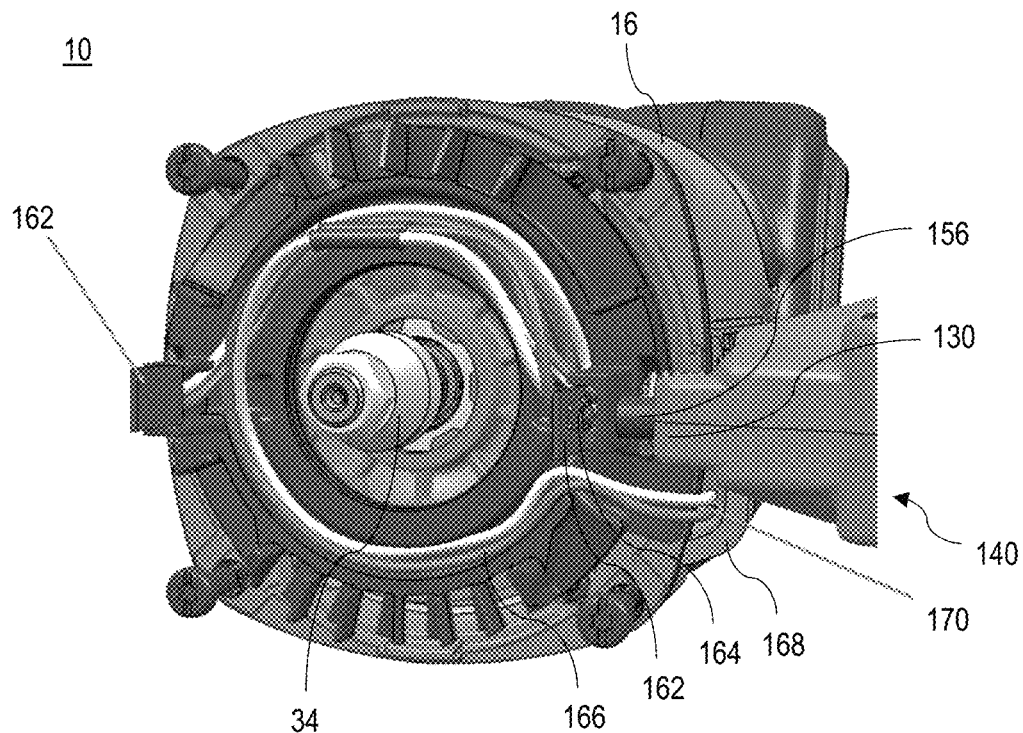
FIG. 11 depicts a partial view of the grinder with gear case removed, showing the side handle mounted on the grinder, according to an embodiment.
Figure 12:
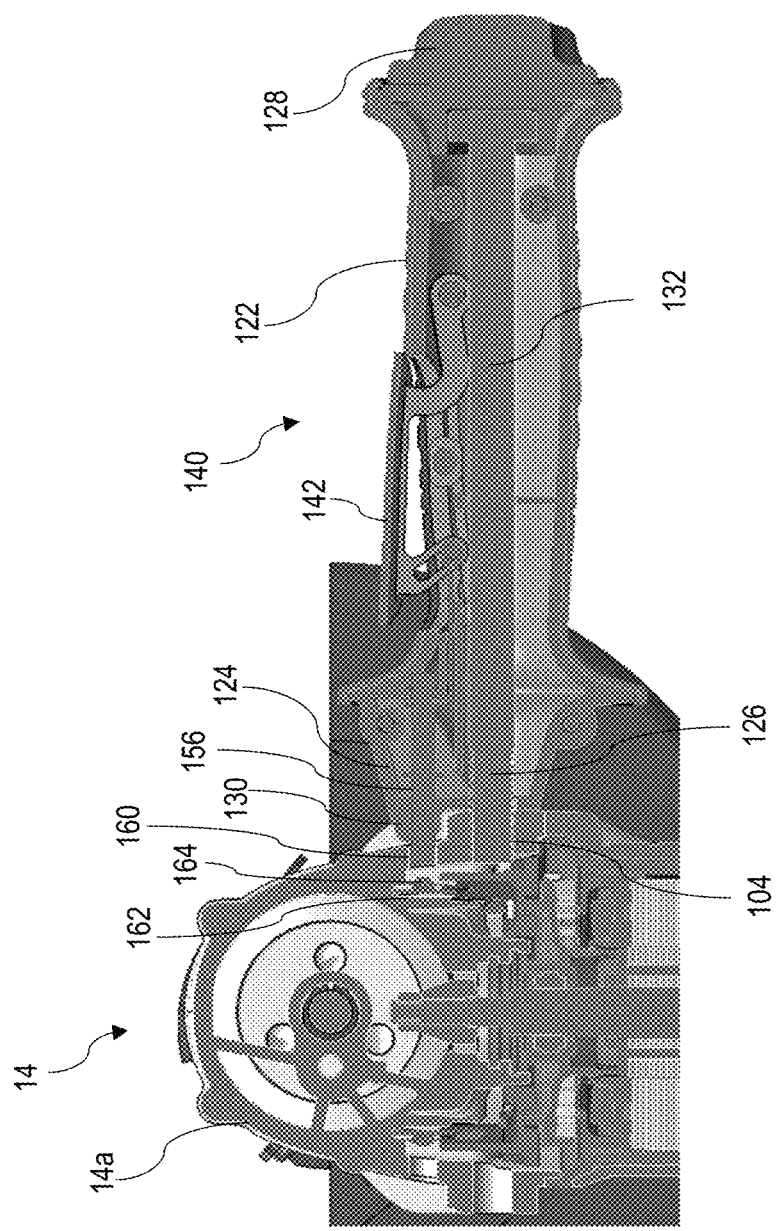
FIG. 12 is a top cross-sectional view of the grinder with the side handle mounted, according to an embodiment.

FIG. 10 depicts a perspective view of the grinder 10, according to an embodiment. FIG. 11 depicts a partial view of the grinder 10 with gear case 14 removed, showing the side handle 140 mounted on the grinder 10. FIG. 12 is a top cross-sectional view of the grinder 10 with the side handle 140 mounted, according to an embodiment.

Figure 13:
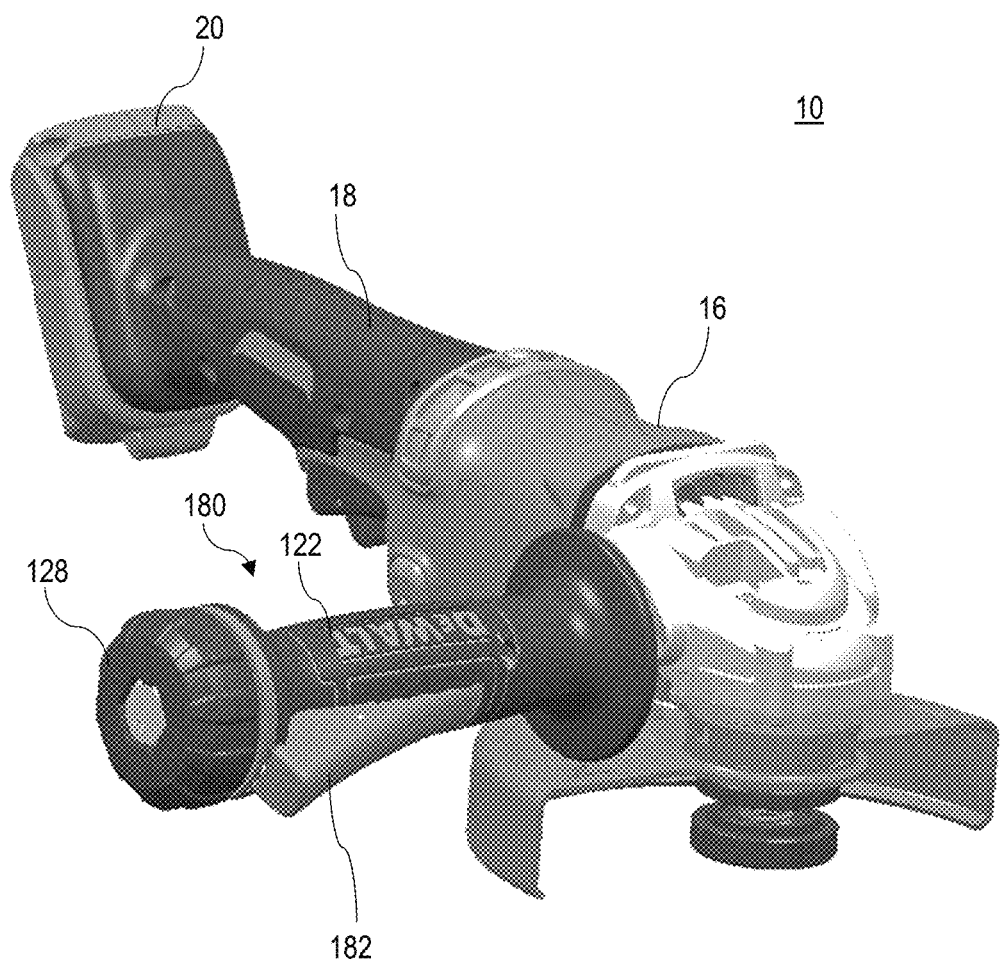
FIG. 13 depicts a perspective view of the grinder and a side handle including an electronic switch, according to yet another embodiment.
Figure 14:
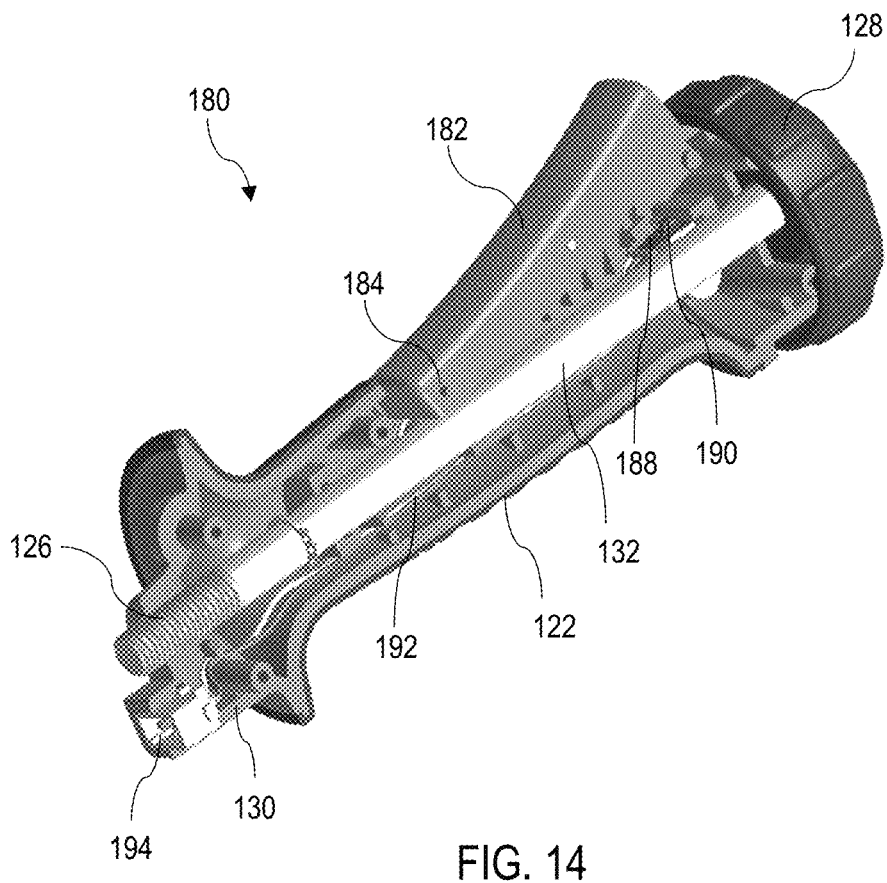
FIG. 14 depicts a side view of the side handle including the electronic switch, according to an embodiment.
Figure 15:
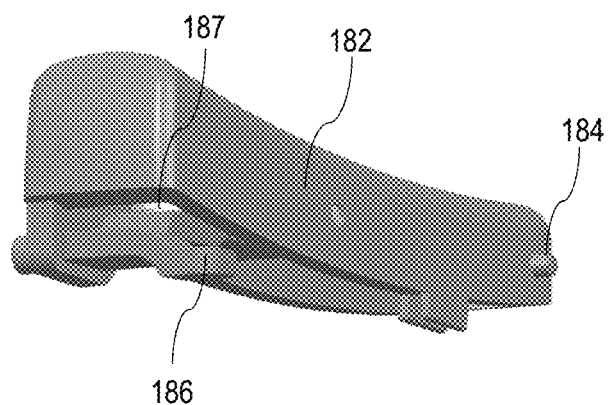
FIG. 15 depicts a perspective view of a trigger switch of the side handle including the electronic switch, according to an embodiment.

As shown in these figures, in an embodiment, grinder 10 is provided with plunger pin holes 160 on opposite sides of the gear case 14 adjacent to and axially forward of the threaded openings 104. In an embodiment, each plunger pin hole 160 is located within the gap formed between the planar tabs 110*a,* 110*b* of the keying feature 110. In an embodiment, a circuit board 162 is secured within the gear case 14 radially inward of each of the plunger pin holes 160. An electronic switch 164 is mounted on each of the circuit boards 162 radially inline with the corresponding plunger pin hole 160. A series of wires 166 are routed between the two circuit boards 162 around the rotor shaft 34. The wires 166 are directed from the gear case 14 into the motor case 16 through a cavity 170 formed by a projection portion 168 of the motor case 16 adjacent the threaded opening 104. The wires 166 are routed through the motor case 16 and are coupled to a controller (not shown) located downstream from the motor 28 that control supply of power to the motor 28. The electronic switch 164 is positioned such that, when the trigger switch 142 of the side handle 140 is pressed, the end of the plunger 156 makes contact with the electronic switch 164 to transmit a signal through the wires 166 to the controller, alerting the controller to begin operating the motor 28. In an embodiment, the controller may be mounted FIG. 13 depicts a perspective view of the grinder 10 and a side handle 180 including an electronic switch 190, according to yet another embodiment. FIG. 14 depicts a side view of the side handle 180, according to an embodiment. FIG. 15 depicts a perspective view of a trigger switch 182 of the side handle 180, according to an embodiment.

In this embodiment, to the extent that side handle 180 includes the features described above, the same reference numerals are used. Like the above embodiment, trigger switch 182 of the side handle 180 is actuatable by the user when the user's hand is on the main gripping body 122 of the side handle 140. Furthermore, the non-rotatable configuration of the main gripping body 122 ensures that the trigger switch 182 is always forward of the main gripping body 122 along the axial direction of the grinder 10. However, instead of a moveable plunger that engages an electronic switch on the grinder, the side handle 180 itself includes the electronics and wiring to generate and transmit a signal to the grinder 10 when the trigger switch 182 is pressed by the user, alerting the controller to begin operating the motor 28.

In an embodiment, side handle 180 pivotably supports the trigger switch 182 via a pivot member 184 provided on the side handle 182. A switch actuator arm 186 is provided below the trigger switch 182 at a distance from the pivot member 184. A circuit board 188 is secured within the main gripping body 122 facing the switch actuator arm 186. A spring member (not shown) biases the trigger switch 182 away from the circuit board 188. Pressing the trigger switch 182 relative the main gripping body 122 causes the switch actuator arm 186 to move towards the circuit board 188 in selective engagement with an electronic switch 190 mounted on the circuit board 188. In an embodiment, an additional spring member 187 is provided between the switch actuator arm 186 and the trigger switch 182 to provide stress relief for the electronic switch 190 in the event of an overtravel of the trigger switch 182. The electronic switch 190 is coupled via wires 192 passing through the main gripping body 122 to a connector 194 disposed at an end of the main gripping body 122 adjacent the threaded end 126 of the rod 132. In an embodiment, connector 194 is provided where notch 130 is formed.

Figure 16:
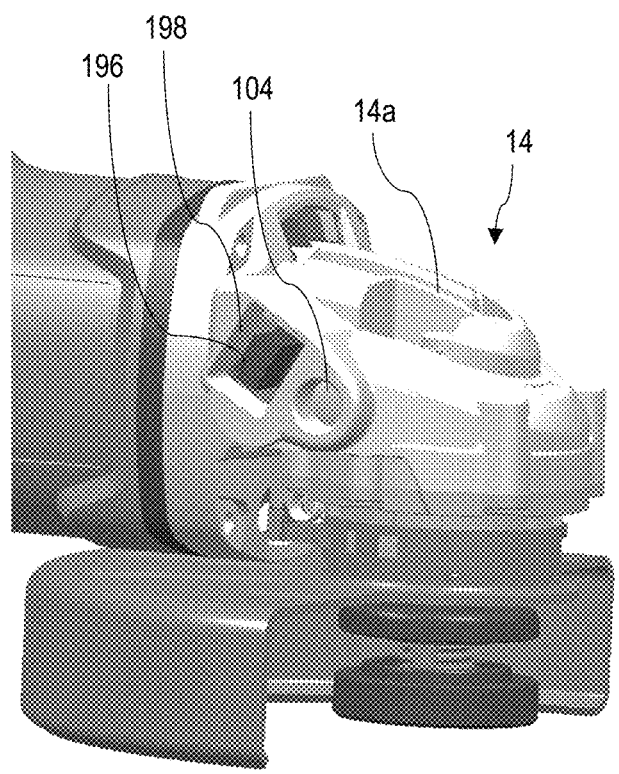
FIG. 16 depicts a side perspective view of the grinder including a connector to coupling with the side handle, according to an embodiment.

FIG. 16 depicts a side perspective view of the grinder 10 including a connector 196 for coupling with the connector 194 of the side handle 180, according to an embodiment. In an embodiment, connector 196 is a male connector provided on the gear case 14 of the grinder 10 that males with connector 194 of the side handle 180. In an embodiment, connector 196 is disposed within an opening 198 on either side of the gear case 14 adjacent the threaded opening 104. When the electronic switch 190 is pressed, it transmits a signal, through the wires 192 and the connectors 194 and 196, to the controller (not shown) of the grinder 10, enabling the controller to begin operating the motor 28. In an embodiment, the connectors 194 and 194 further communicate to supply electric power from the grinder 10 to the electronic switch 190.

In an embodiment, opening 198 is sized to receive the notch 130 of the side handle 180 therein, thus preventing the main gripping body 122 of the side handle 140 from rotating relative to the grinder 10 as the threaded end 126 of the rod 132 is tightened into the threaded opening 104 via the knob 128. In an embodiment, opening 198 is provided rearward of the threaded opening 104.

Figure 17:
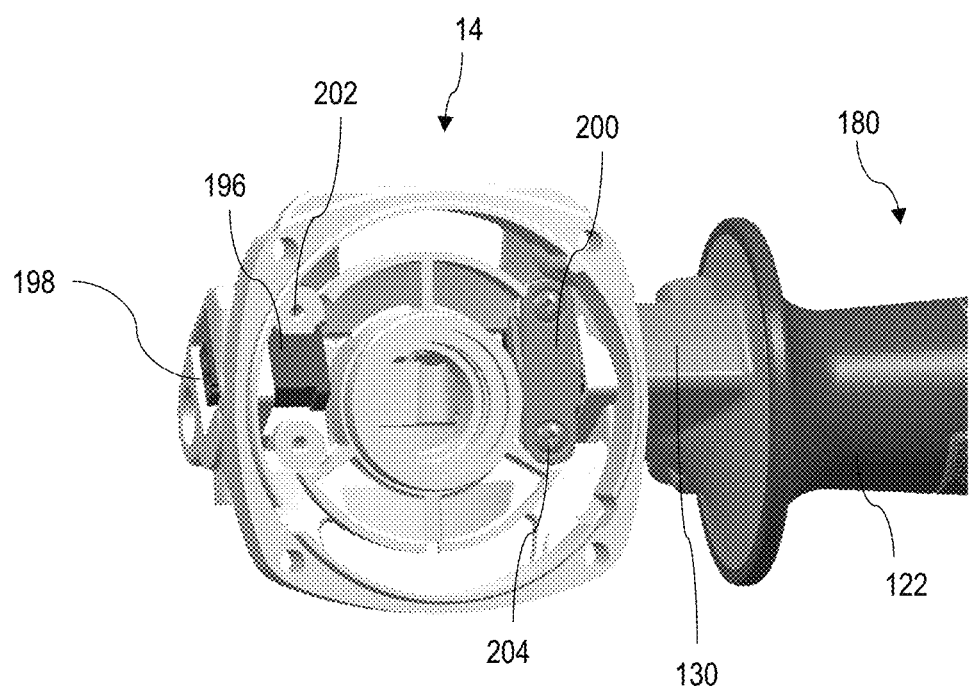
FIG. 17 depicts a rear view of the gear case showing two connectors provided on opposite sides, according to an embodiment.

FIG. 17 depicts a rear view of the gear case 14 including the two connectors 196 provided on opposite sides of the gear case 14, according to an embodiment. In an embodiment, gear case 14 includes two retainers 200 (only one of which is shown here) provided to retain the connectors 196 within the openings 198. In an embodiment, each retainer 200 is fastened into threaded openings provided on a rear surface of the gear case 14 via a series of fasteners 204.

It has been found that the optimal position of the trigger switch relative to the side handle may vary depending on user preference. Some users may prefer the trigger switch to be forward or below the side handle, where it can be pressed by the users' fingers, whereas some may prefer the trigger switch to be above or rearward of the side handle, where it can be pressed by the users' palms. To provide the user the flexibility to position the trigger switch in a desired angular orientation, a side handle having an adjustable main gipping body is provided, as described here.

Figure 18:
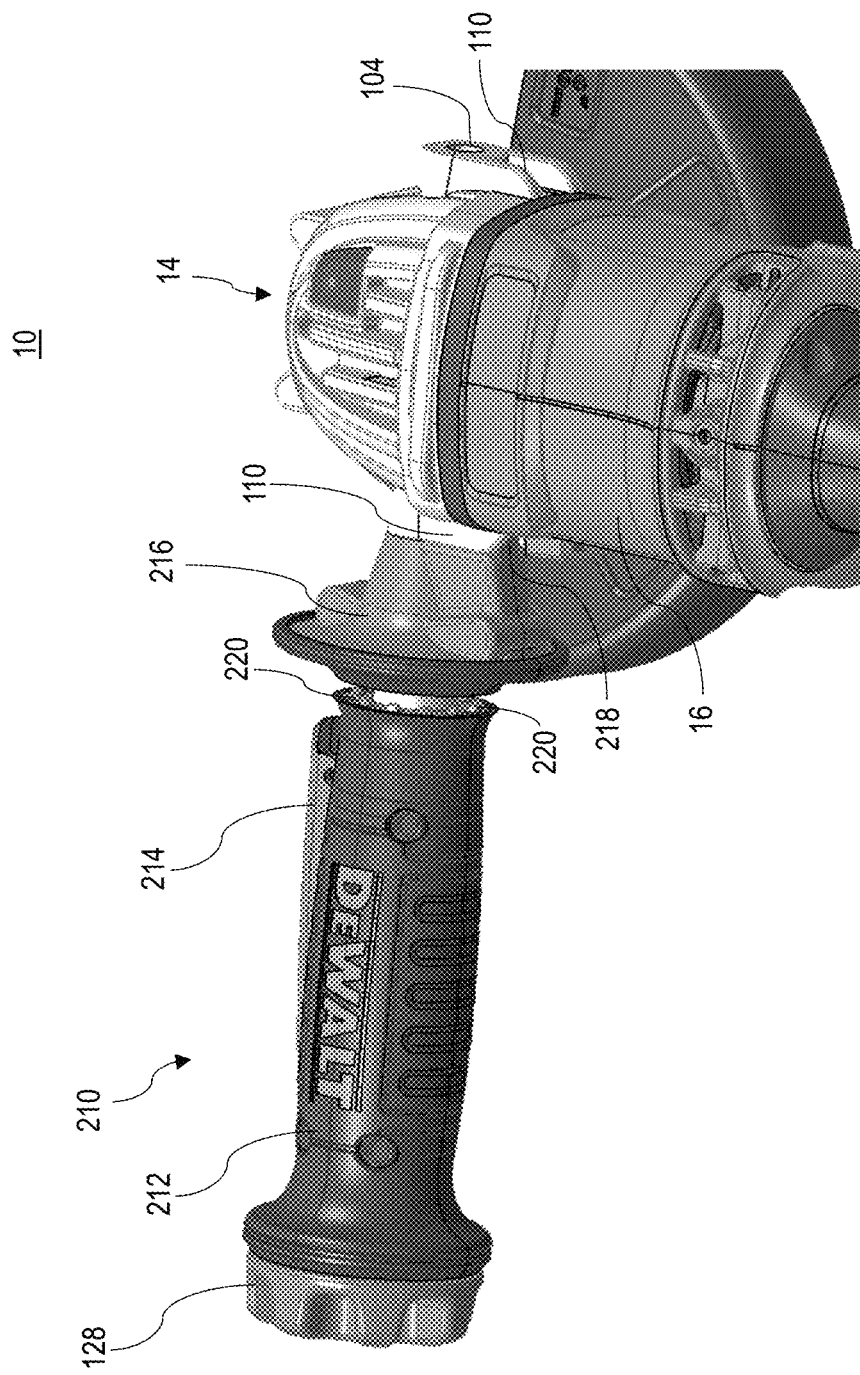
FIG. 18 depicts a perspective view of the grinder and a side handle having a rotatable main gripping body, according to yet another embodiment.
Figure 19:
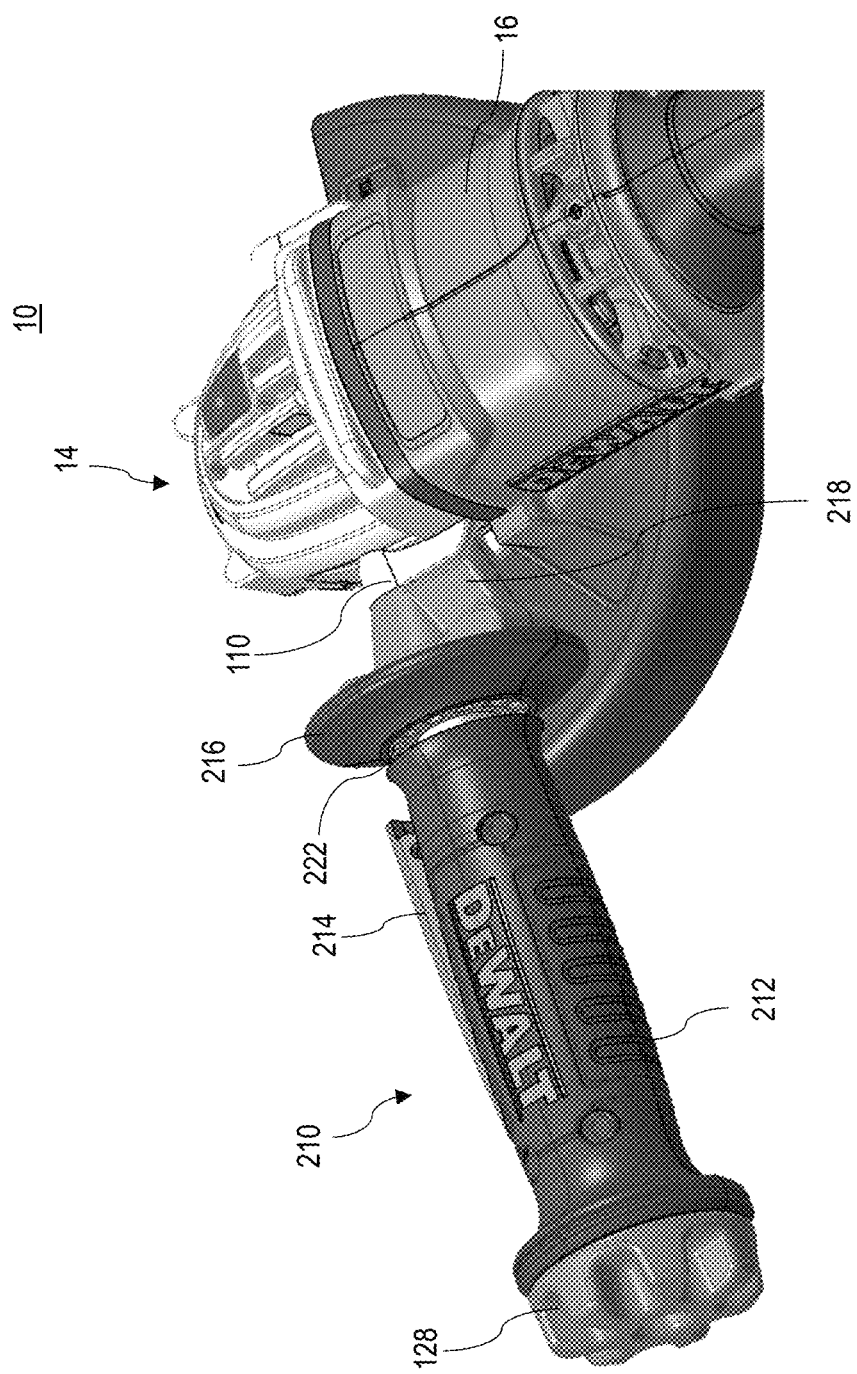
FIG. 19 depicts another perspective view of the grinder and the side handle having the rotatable main gripping body, according to an embodiment.
Figure 20A:
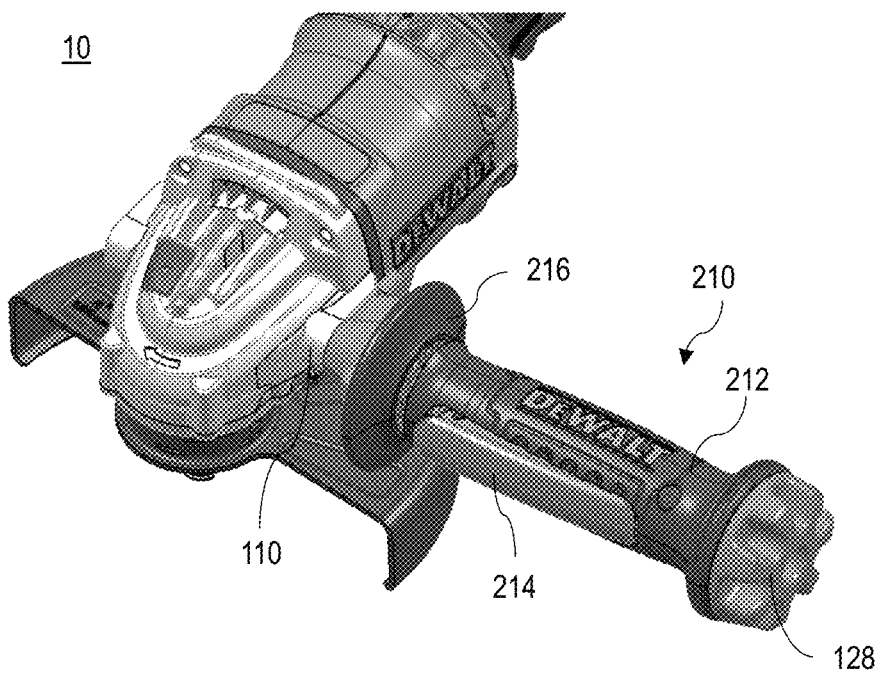
FIGS. 20A-D depict perspective views of the grinder with the rotatable main gripping body of the side handle orientated in different angular positions, according to an embodiment.
Figure 20B:
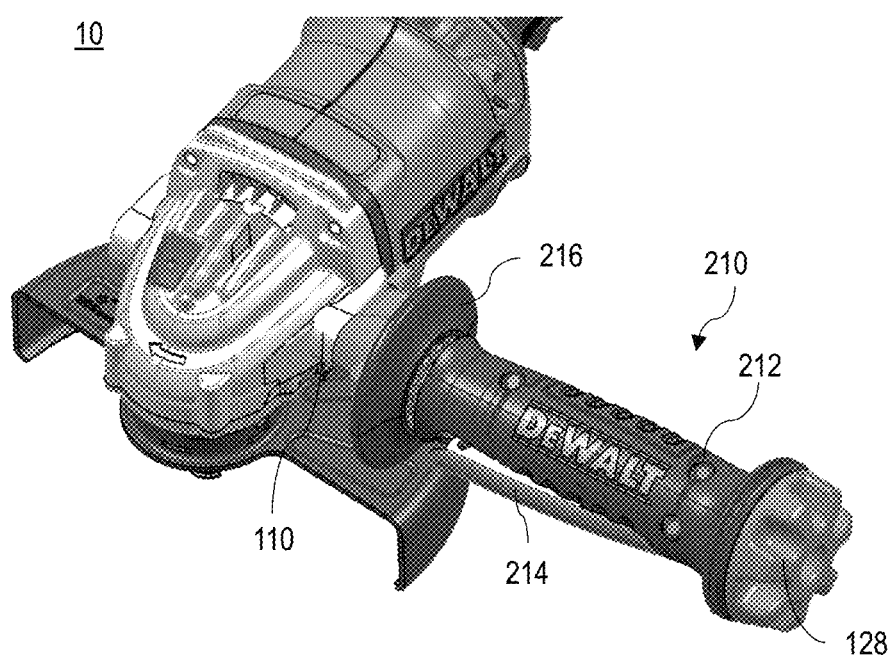
Figure 20C:
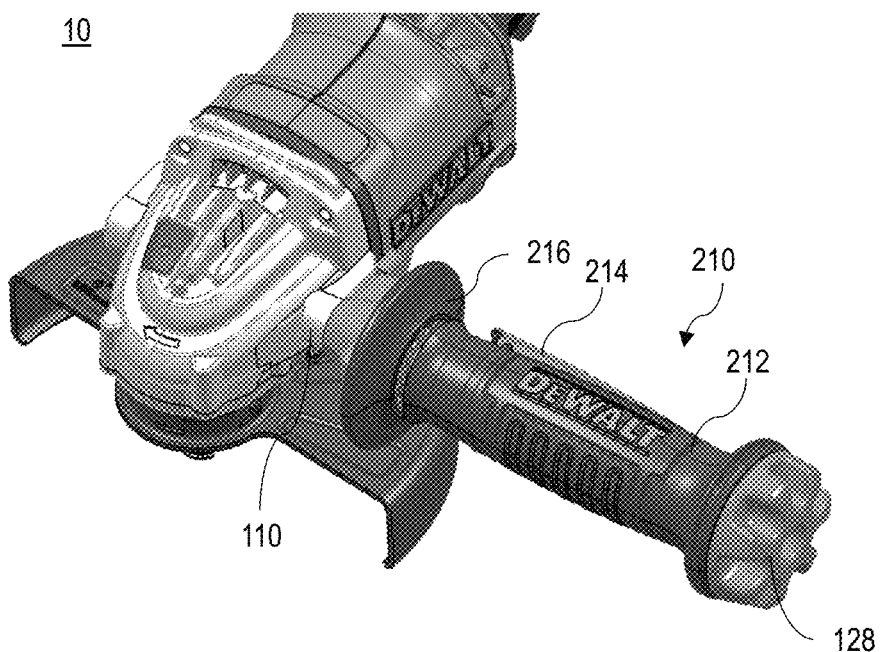
Figure 20D:
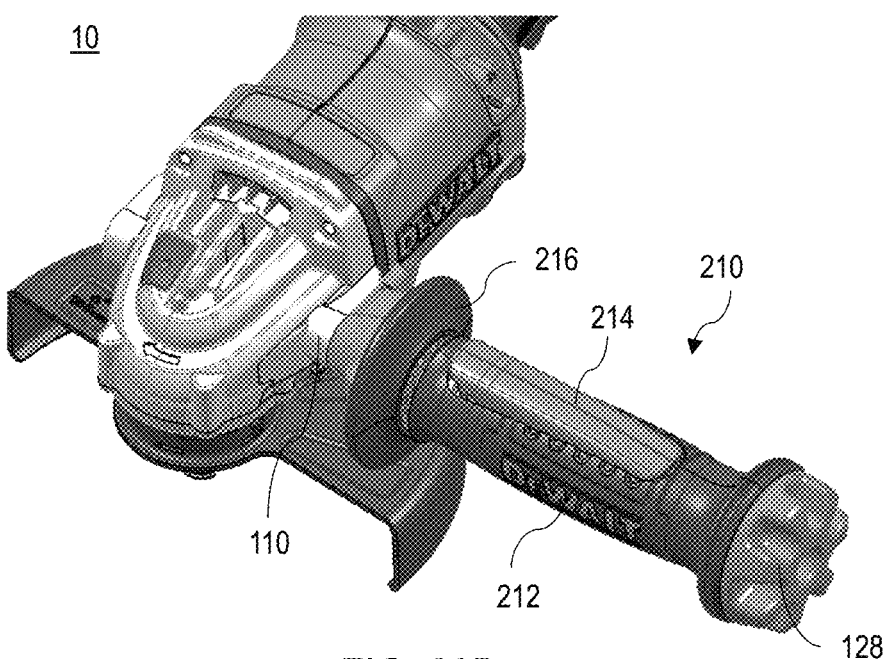

FIGS. 18 and 19 depicts two perspective views of the grinder 10 and a side handle 210 having an adjustable main gripping body 212, according to yet another embodiment. In this embodiment, to the extent that side handle 210 includes the same features described above, the same reference numerals are used, e.g., knob 128. In an embodiment, a trigger switch 214 is mounted on the main gripping body 212 and is actuatable by the user when the user's hand is on the main gripping body 212 of the side handle 210. In an embodiment, the grinder 10 is configured to energize the motor 28 only if the trigger switch 214 is pressed by the user. In an embodiment, a frontal mounting member 216 of the side handle 210 is configured to be decouplable from the main gripping body 212.

In an embodiment, when the side handle 210 is initially mounted on the grinder 10, a notch 218 of the mounting member 216 engages a keying feature 110 of the grinder. It is noted that in this example, the keying feature of 110 extends axially rearward of threaded openings 104 on either side of the gear case 14, though it should be understood that the keying feature 110 may extend forward of the threaded openings 104, as described above, or at any angle or orientation relative to the threaded openings 104. In this position, the knob 128 can be partially rotated to tighten the mounting member 216 to the grinder 10. This ensures that the mounting member 216 is secured and the side handle 210 is properly aligned with the grinder 10. However, in this position, the main gripping body 212 is biased away from the mounting member 216 to maintain a small gap therebetween such that the main gripping body 212 can be rotated relative to the mounting member 216. This allows the user to position the angle of the trigger switch 214 as desired.

FIGS. 20A-D depict perspective views of the grinder 10 with the main gripping body 212 of the side handle 210 orientated in different angular positions (e.g., forward, below, rear, or above the side handle 120), according to an embodiment.

Referring again to FIGS. 18 and 19, the main gripping body 212 includes a series of teeth 220 that peripherally project along the longitudinal axis of the side handle 210 in the direction of the mounting member 216. The mounting member 216 includes a corresponding series of pockets 222 facing the teeth 220. After the main gripping body 212 is rotated to its desired position, the knob 128 is tightened further to force the teeth 220 and pockets 222 to engage, thus rotationally locking the main gripping body 212 to the mounting member 216. The knob 128 is then completely tightened to fully secure the side handle 210 to the grinder 10. In an embodiment, any tongue and groove assembly or other mechanical locking mechanism may be alternatively provided.

Figure 21:
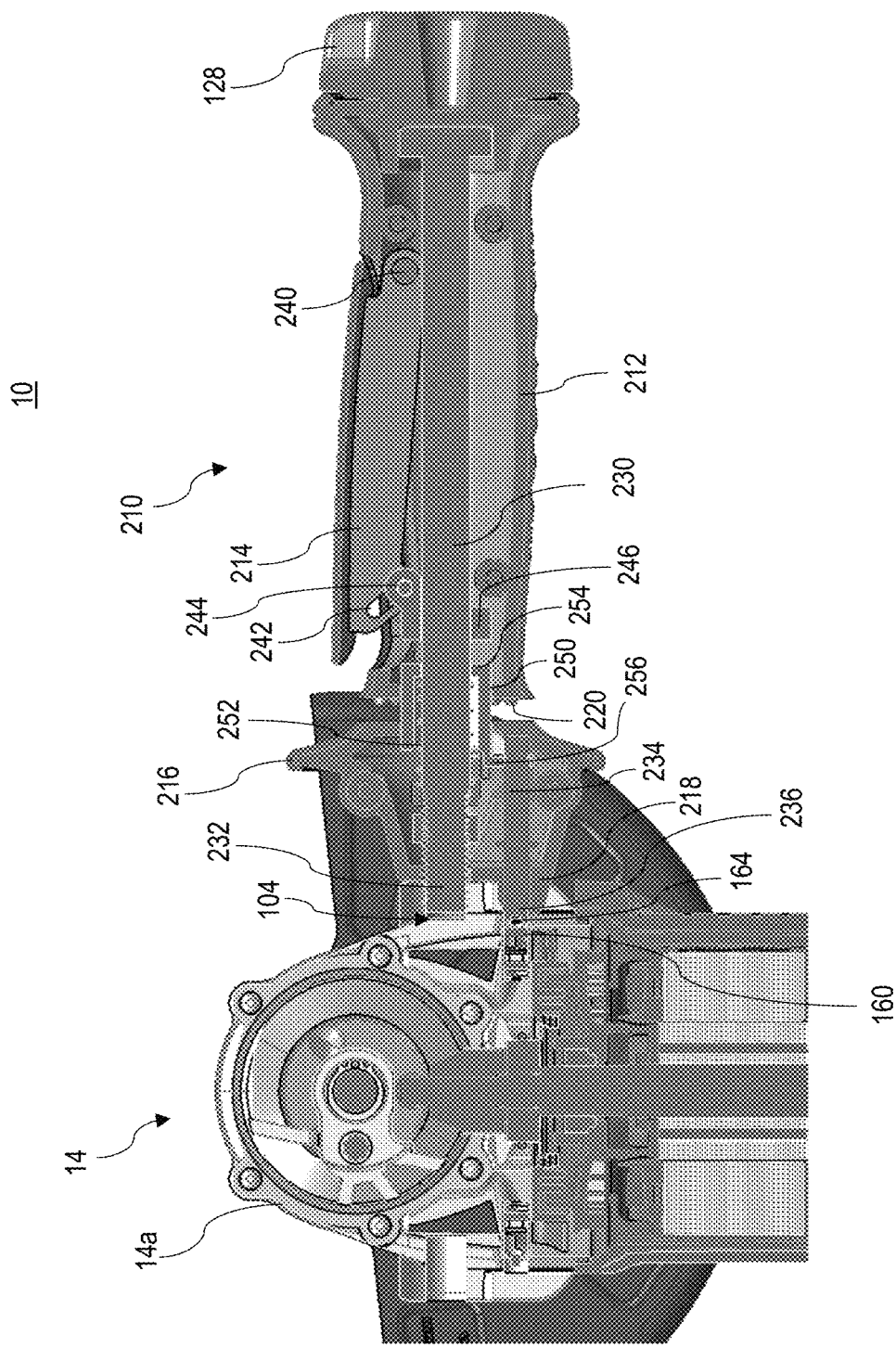
FIG. 21 depicts a side cross-sectional view of the grinder and the side handle partially fastened to allow rotation of the main body, according to an embodiment.
Figure 22:
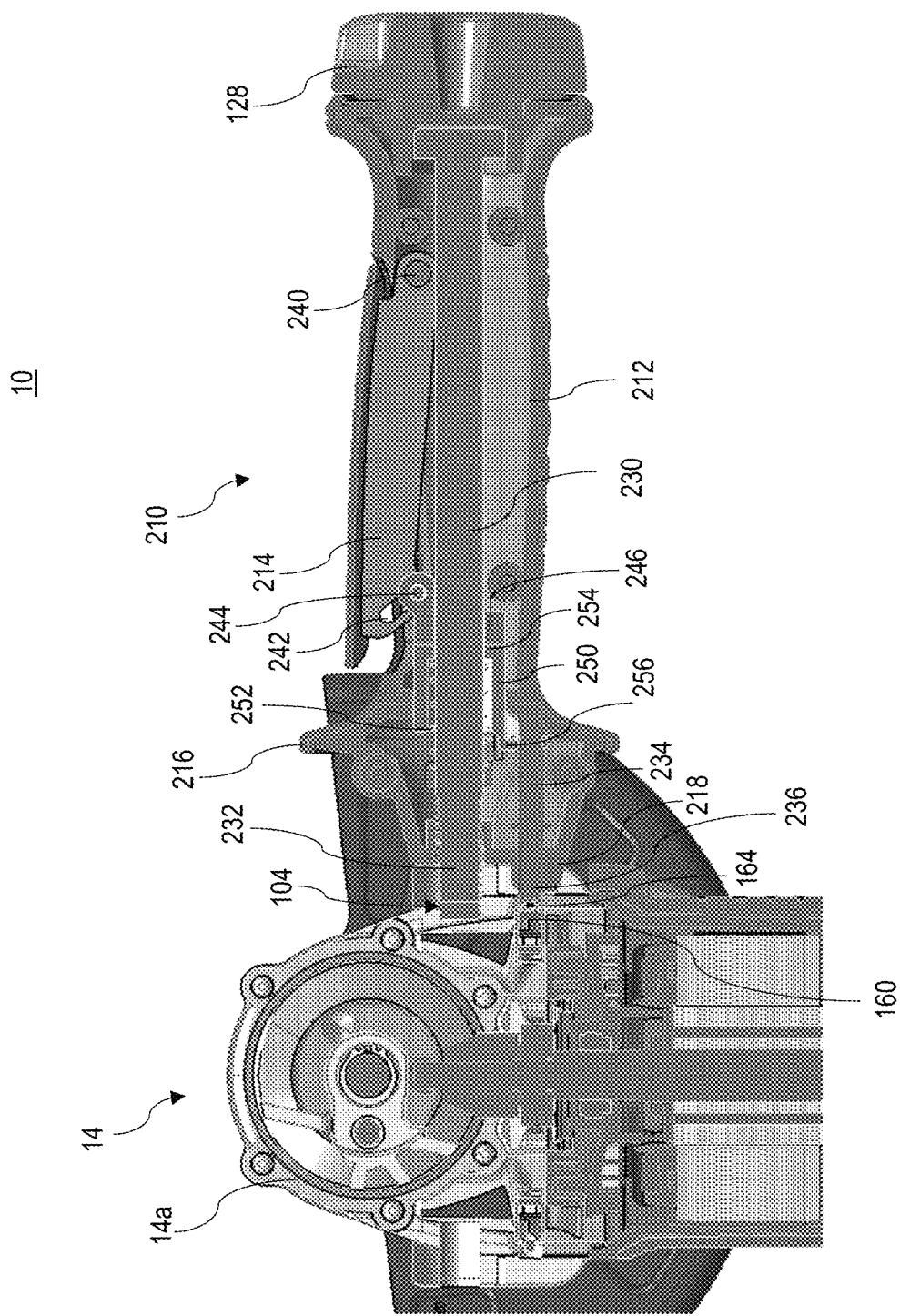
FIG. 22 depicts a side cross-sectional view of the grinder and the side handle fully fastened to prevent rotation of the main body, according to an embodiment.

FIG. 21 depicts a side cross-sectional view of the grinder 10 and the side handle 210 partially fastened to allow rotation and adjustment of the main gripping body 212, according to an embodiment. FIG. 22 depicts a side cross-sectional view of the grinder 10 and the side handle 210 fully fastened to the main gripping body 212 to the mounting member 216, according to an embodiment.

In an embodiment, as shown in these figures, side handle 210 includes a rod 230 extending through the main gripping body 212 and the mounting member 216. The knob 128 is mounted on one end of the rod 230 opposite a threaded end 232. This allows the knob 128 and the rod 230 to together rotate relative to both the main gripping body 212 and the mounting member 216, allowing the threaded end 232 of the rod 230 to fastened into the threaded opening 104 of the grinder 10.

In an embodiment, mounting member 216 houses a plunger 234 that extends adjacent the threaded end 232 of the rod 230 at a distance of approximately 4 mm to 14 mm. As described above, plunger pin hole 160 is provided on either side of the gear case 14 and provides access for the plunger 234 to selectively engage electronic switch 164. Actuation of the trigger switch 214 causes the plunger 234 to move in the direction of the gear case 14 and into the plunger pin hole 160, as described here.

In an embodiment, a first end of the trigger switch 214 is pivotably supported by the main gripping body 212 via pivot pin 240. A second end of the trigger switch 214 includes one or more elongated apertures 242 that extends at approximately a 40 to 60 degree angle relative to the axis of the rod 230 and support a laterally-oriented bar 244. The bar 244 is linked to a first moveable member 246 that is slidably disposed around the rod 230. Owing to the angular orientation of the elongated apertures 242, actuation of the trigger switch 214 forces the first moveable member 246 to move along the longitudinal axis in the direction of the mounting member 216. It should be understood that the trigger switch 214 may be provided with alternative designs, including alternative pivot points, linkages, etc., capable of apply an axial force the first moveable member 246.

In an embodiment, disposed between the main gripping body 212 and the mounting member 216 is a second moveable member 250. Second moveable member 250 is shaped as a cylinder having a first end that is housed within the mounting member 216 and a second end that is housed within the main gripping body 212 adjacent the first moveable member 246. The first end of the second moveable member 250 is open and receives a spring element 252 therethrough. The second end of the second moveable member 250 includes a radial wall 254 that catches an end of the spring element 252. A center through-hole is formed in the radial wall 254 through which the rod 230 extends. A lip 254 projects away from the first end of the second moveable member 250 and is connected to the plunger 254 such that the plunger 254 is moveably coupled to the second moveable member 250. The spring element 252 bias the second moveable member 250 in the direction of the main gripping body 212, thus forcing the plunger 234 away from the electronic switch 164.

In an embodiment, when the side handle 210 is merely partially fastened to the grinder 10, as shown in FIG. 21, the first and second moveable members 246 and 250 are decoupled from one another. In an embodiment, the distance between the first and second moveable members 246 and 250 allows the two to remain decoupled even if the trigger switch 214 is pressed by the user in this partially fastened position. This ensures that the contact between the first and second moveable members 246 and 250 does not prevent or constrain the rotation of the main gripping body 212 relative to the mounting member 216.

In an embodiment, when the side handle 210 is fully fastened to the grinder 10, as shown in FIG. 22, the first and second moveable members 246 and 250 come into contact with one another or are in close proximity to one another. In an embodiment, this ensures that when the trigger switch 214 is actuated by the user in this position, the movement of the first moveable member 246 in the direction of the gear case 14 is transferred via the second moveable member 250 to the plunger 234, causing the electronic switch 164 to be pressed by the plunger 234.

In an embodiment, it is desirable to provide the side handle trigger with an audible and/or tactile feedback to alert the operator when the trigger has been activated or released. This added feedback is particularly helpful in configurations including a microswitch, either within the side handle such as electronic switch 190 of FIG. 14, or within the power tool such as electronic switch 164 of FIG. 21. Accordingly, in an embodiment, the side handle is provided with an added audible and/or tactile mechanism to help provide feedback to the operator when the microswitch has been activated or deactivated. This embodiment is described herein with reference to FIGS. 23-30.

Figure 23:
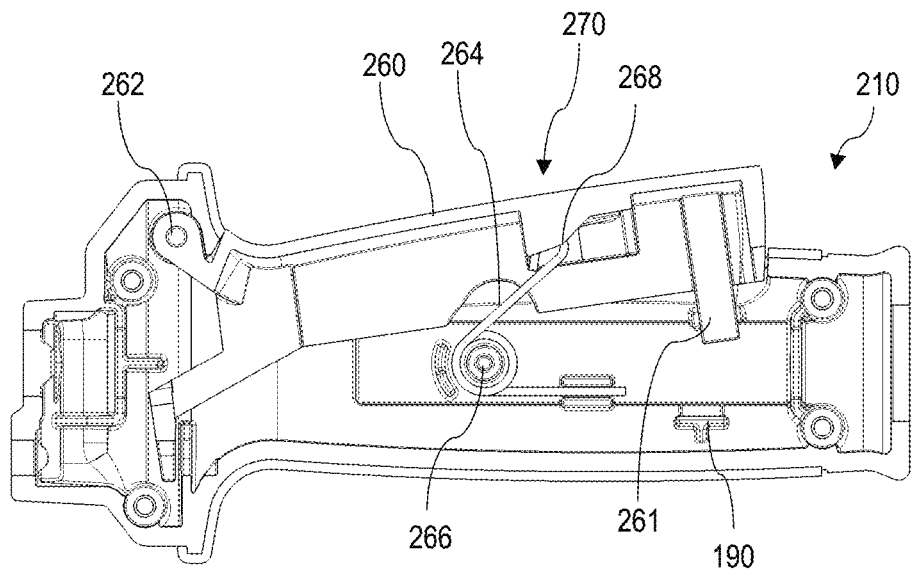
FIG. 23 depicts a side sectional view of side handle including a trigger switch in a disengaged position, according to an embodiment.
Figure 24:
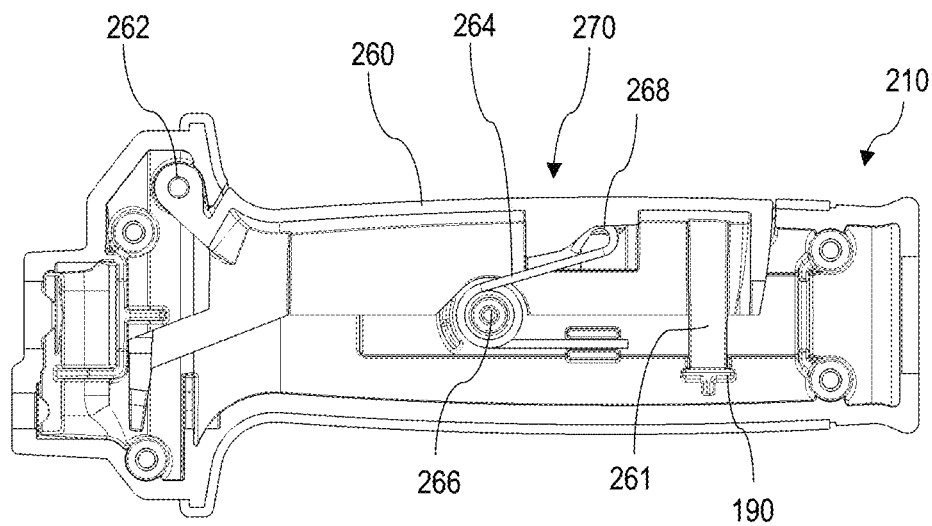
FIG. 24 depicts the same side sectional view of side handle, with trigger switch in a fully engaged position, according to an embodiment.

FIG. 23 depicts a side sectional view of side handle 210 including a trigger switch 260 in a disengaged position, according to an embodiment. FIG. 24 depicts the same side sectional view of side handle 210, with trigger switch 260 in a fully engaged position, according to an embodiment.

In this embodiment, trigger switch 260 includes many of the features described above, including a plunger 261 for engagement with electronic switch 190 within the side handle 210. Further, trigger switch 260 is pivotably coupled to the side handle 210 via a pivot mechanism 262, allowing the plunger 261 to move towards or away from the electronic switch 190 with actuation or disengagement of the trigger switch 260. In an embodiment, a spring 264 is further provided within the side handle 210 to applying a biasing force to the trigger switch 260 towards the disengaged position. Spring 264 is mounted on a support pin 266 of the side handle 210. Spring 264 includes a rounded end 268 formed as a hook, a loop, a v-hook, or an eye at the end of the spring 264.

In an embodiment, trigger switch 260 is provided with a feedback mechanism 270 arranged to engage the rounded end 268 of the spring 264 and produce a tactile and/or audible feedback as the trigger switch 260 is engaged or disengaged by the operator.

Figure 25:
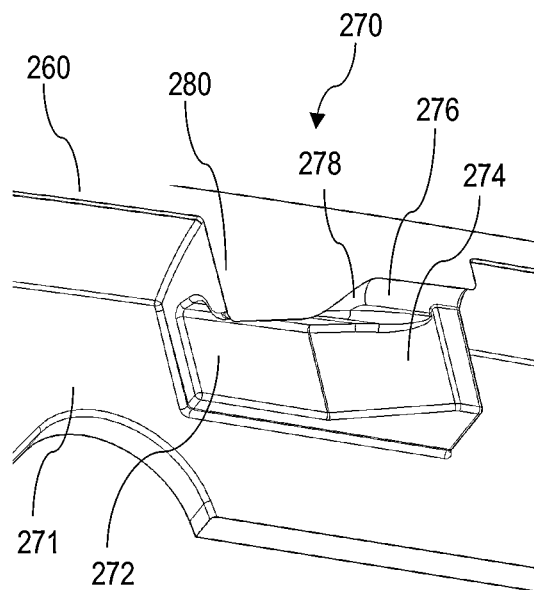
FIG. 25 depicts a perspective view of the feedback mechanism, according to an embodiment.
Figure 26:
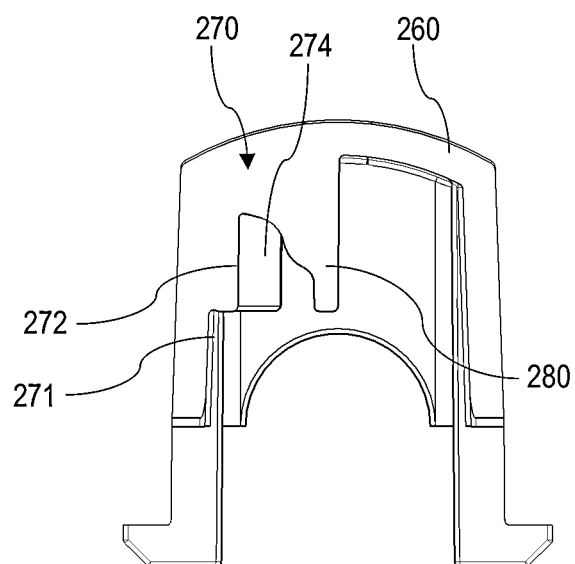
FIG. 26 depicts a side axil view of the trigger switch and the feedback mechanism, according to an embodiment.
Figure 27:
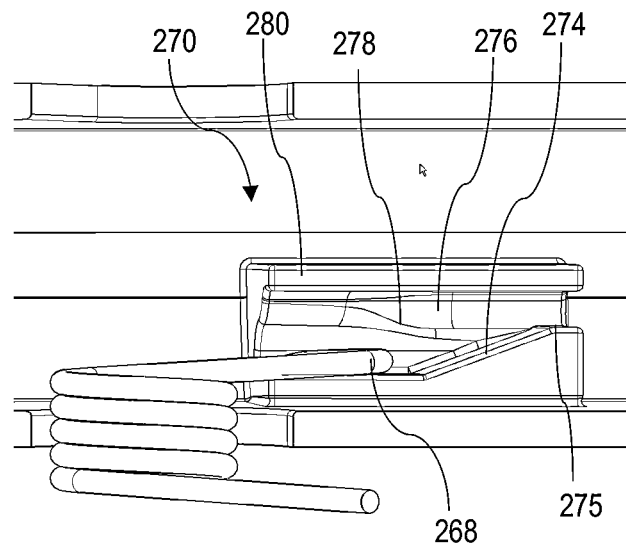
FIGS. 27 and 28 depict bottom views of the feedback mechanism and the spring in the disengaged and engaged positions of the trigger switch respectively, according to an embodiment.
Figure 28:
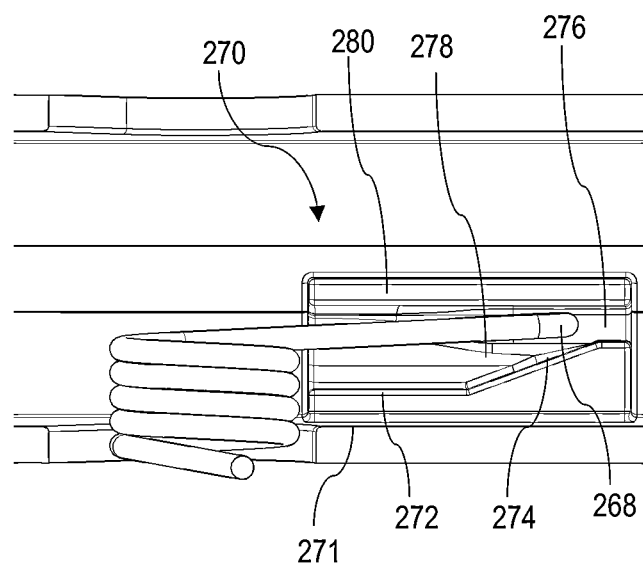
Figure 29:
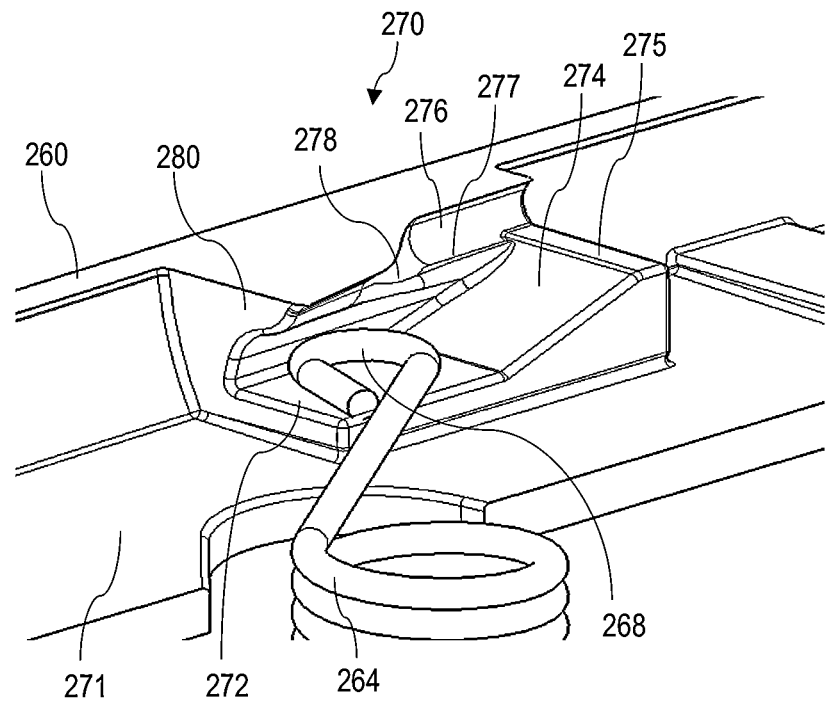
FIGS. 29 and 30 depict perspective views of the feedback mechanism and the spring in the disengaged and engaged positions of the trigger switch respectively, according to an embodiment.
Figure 30:
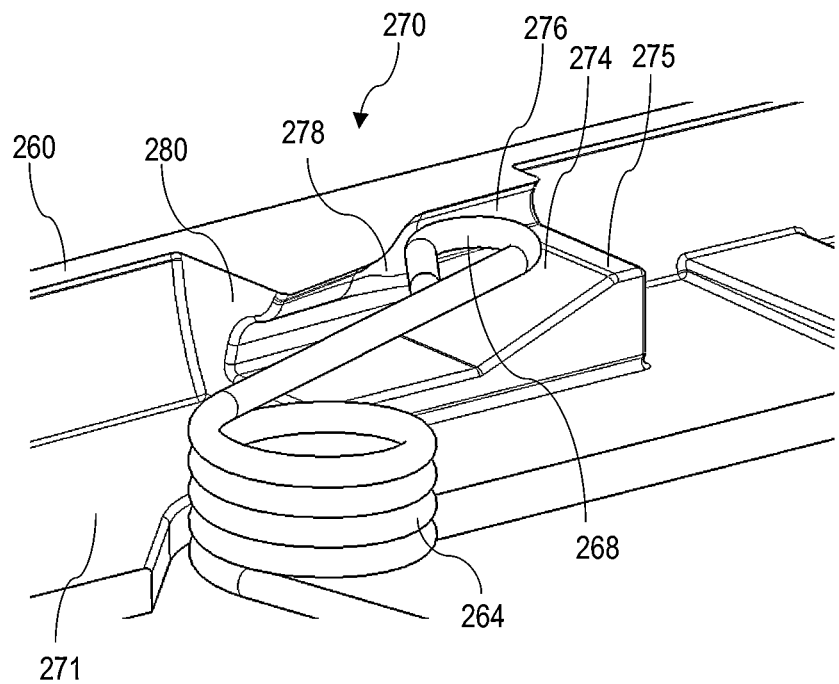

FIG. 25 depicts a perspective view of the feedback mechanism 270, according to an embodiment. FIG. 26 depicts a side axil view of the trigger switch 260 and the feedback mechanism 270, according to an embodiment. FIGS. 27 and 28 depict bottom views of the feedback mechanism 270 and the spring 264 in the disengaged and engaged positions of the trigger switch 260 respectively, according to an embodiment. FIGS. 29 and 30 depict perspective views of the feedback mechanism 270 and the spring 264 in the disengaged and engaged positions of the trigger switch 260 respectively, according to an embodiment.

In an embodiment, with reference to these figures, the feedback mechanism 270 includes: a flat surface 272 located on an inner side surface 271 of the trigger switch 260, a wall 280 extending from a top portion of the trigger switch 260 substantially parallel to the inner side surface 271, a ramped surface 274 extending from an end of the flat surface 272 away from the inner side surface 271 and in the direction of the wall 280, a channel 276 formed partially by the wall 280 and partially by a lip 277 that extends from an end 275 of the ramped surface 274 opposite the flat surface 272 and substantially parallel to the wall 280, and a chamfer 278 formed at a front end of the channel 276.

In an embodiment, in a neutral disengaged position of the trigger switch 260, the rounded end 268 of the spring 264 rests on the flat surface 272. As the trigger switch 260 is pressed by the operator, the rounded end 268 slidingly travels from the flat surface 272 to the ramped surface 274. In a position where the plunger 261 of the trigger switch 260 makes contact with the electronic switch 190, the rounded end 268 reaches the end 275 of the ramped surface 274 and, due to its own biasing force, snaps inside the channel 276. The outward snapping movement of the rounded end 268 into the channel 276 provides an audible and/or tactile feedback to the operator when the trigger switch 260 is in its engaged position.

In an embodiment, as the trigger switch 260 is disengaged by the operator, the rounded end 268 travels within the channel 276 in engagement with the lip 277 at a distance from the flat surface 272. As the rounded end 268 traverses over the chamfer 278, it is released from engagement with the lip 277 and snaps into contact with the flat surface 272. This lateral snapping movement of the rounded end 268 against the flat surface 272 provides an audible and/or tactile feedback to the operator when the trigger switch 260 is in its disengaged position.

Embodiments described above provide a mechanism whereby the operator has to not only mount the side handle, but also grip the side handle and actuate the side handle trigger (herein referred to as auxiliary trigger) for the tool to operate to ensure that both hands are always on the tool during operation. The tool controller is thus configured to disrupt flow of current to the motor if either of the triggers is released during use.

Figure 31:
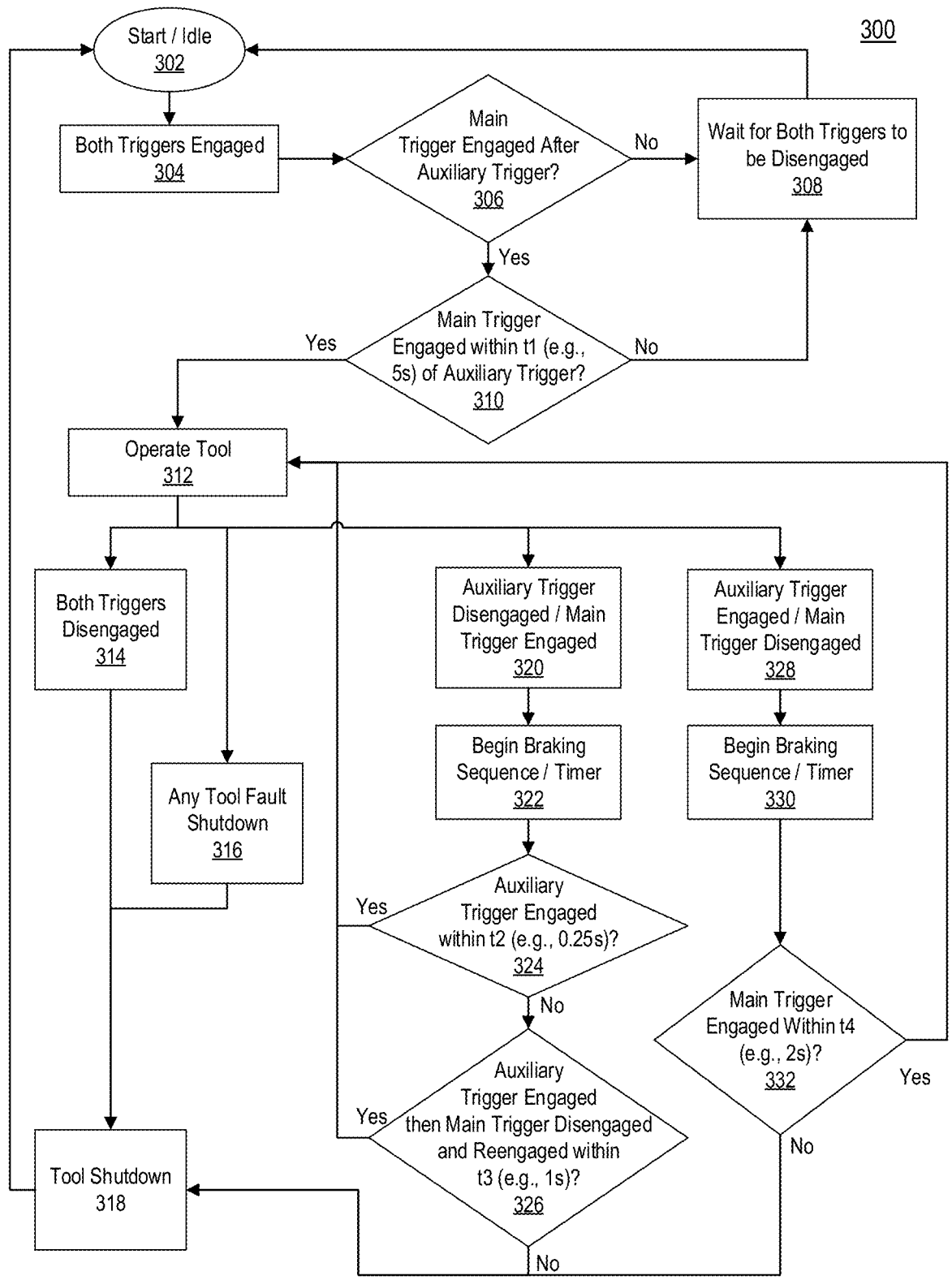
FIG. 31 depicts an operational flow diagram for ensuring that both the side handle trigger and the main trigger are engaged by the operator for operating the power tool, according to an embodiment.

FIG. 31 depicts an operational flow diagram for a process 300 executed by the power tool controller to ensure that both the auxiliary trigger and the main trigger are engaged by the operator for operating the power tool, according to an embodiment. In an embodiment, this process 300 ensure proper and optimal actuation sequence of the two triggers at start-up, and accounts for trigger feathering and grip adjustment. Trigger feathering refers to rapid pressing and releasing of the main trigger by the operator while performing certain tasks. Grip adjustment refers to the operator temporarily releasing the auxiliary trigger to adjust the location of their grip on the side handle.

In an embodiment, process 300 starts at a start-up or idle position (step 302). Engagement of the auxiliary trigger and the main trigger is sensed (step 304). The process then 300 determines whether the main trigger has been engaged after the auxiliary trigger (step 306). If it has not, process 300 waits for both triggers to be disengaged (step 308) prior to returning to idle (step 302). This ensures that the tool can be operated only if the auxiliary trigger is actuated prior to the main trigger.

In addition, process 300 determines whether the main trigger has been engaged within a time threshold t1 of the actuation of the auxiliary trigger (step 310). Time threshold t1 may be, for example, approximately 3 to 8 seconds, preferably approximately 4 to 7 seconds, more preferably approximately 5 to 6 seconds. This may be executed by starting a timer once the auxiliary trigger has been actuated. If the main trigger has been engaged after the timer reaches t1, the process waits for both triggers to be disengaged (step 308) prior to returning to idle (step 302). This ensures that an operator is not able to fool the controller into a single hand operation, for example, by tying either of the switches into the ON position and solely using the other switch for tool operation.

If it is determined that the main trigger is engaged within t1 after the auxiliary trigger, the process proceeds to operate the tool in step 312. At any point during normal operation, if process 300 determines that both triggers are disengaged (step 314), or if the process 300 detects any tool fault condition (step 316), it proceeds to shut down the tool operation (step 318) prior to return to ides (step 302).

Steps 320-326 refer to a grip adjust timer operation. In these steps, if process 300 detects that the auxiliary trigger is disengaged while the main trigger is still engaged (step 320), it does not immediately shut down the tool. Rather, process 300 begins a braking sequence of the motor and starts a timer (step 322). Process 300 then determines if the auxiliary trigger was reengaged quickly within a first time threshold t2 (step 324). First time threshold 21 may be, for example, approximately 0.1 to 0.5 seconds, preferably approximately 0.2 to 0.3 seconds. If yes, the process 300 continues normal tool operation (step 312). This ensures that the system does not shut down if the operator lets go of the auxiliary trigger for a very short amount of time while adjusting their grip. If the auxiliary trigger was not reengaged within the time threshold t2, process 300 determines if the auxiliary trigger was reengaged, then the main trigger was released and reengaged, all within a second time threshold t3 (step 326). Second time threshold t3 may be, for example, approximately 0.5 to 3 seconds, preferably approximately 1 to 2 seconds. If yes, the process 300 continues normal tool operation (step 312). This ensures that the system does not shut down if the operator reengages both triggers after temporarily letting go of the auxiliary trigger. If the operator does not quickly reengage the auxiliary trigger in step 324, or does not reengage both triggers in step 326, the tool is shut down in step 318.

Steps 328-332 refer to a feathering timer operation. In these steps, if process 300 detects that the main trigger is disengaged while the auxiliary trigger is still engaged (step 328), it does not immediately shut down the tool. Rather, process 300 begins an electronically braking sequence of the motor and starts a timer (step 330). Process 300 then determines if the main switch was reengaged within a time threshold t4 (step 332). Time threshold t4 may be, for example, approximately 1 to 4 seconds, preferably approximately 2 to 3 seconds. If yes, the process 300 continues normal tool operation (step 312). This ensures that the system does not shut down if the operator lets go of the main trigger temporarily while feathering the main trigger. If the operator does not quickly reengage the main trigger trigger in step 332, the tool is shut down in step 318.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A side handle for a power tool comprising:
    a main gripping body;
    a rod extending through the main gripping body and having a threaded end extending through a frontal end of the main gripping body; and
    a knob mounted on an end of the rod opposite the threaded end and being rotatable relative to the main gripping body;
    wherein the frontal end of the main gripping body includes a keying feature operable to engage a portion of the power tool to prevent rotation of the main gripping body relative to the power tool while the knob is rotated to fasten the threaded end of the rod to a threaded opening of the power tool.

2. The side handle of claim 1, wherein the keying feature includes a notch projecting adjacent the threaded end of the rod.

3. The side handle of claim 1, further comprising a trigger switch located on the main gripping body.

4. The side handle of claim 3, wherein the trigger switch is located forward of the main gripping body as the side handle is fastened onto the power tool.

5. The side handle of claim 3, further comprising a plunger coupled to the trigger switch, the plunger being configured to selectively engage a switch located on the power tool when the trigger switch is pressed.

6. The side handle of claim 3, further comprising an electronic switch located within the main gripping body, the electronic switch being selectively engaged when the trigger switch is pressed, wherein the electronic switch transmits a signal to the power tool.

7. The side handle of claim 1, further comprising:
a spring disposed within the main gripping body to bias the trigger switch away from the main gripping body; and
a feedback mechanism configured to engage the spring to provide a tactile and/or audible feedback to the user upon at least one of actuation or release of the trigger switch.

8. The side handle of claim 7, wherein the feedback mechanism includes a ramped surface arranged to move an end of the spring away from an inner surface of the main gripping body.

9. The side handle of claim 8, wherein the feedback mechanism further includes a channel having a lip extending parallel to the inner surface of the main gripping body, wherein the end of the spring snaps inside the channel when the trigger switch is actuated to a predetermined actuation position.

10. The side handle of claim 9, wherein the feedback mechanism further includes a chamfer that releases the end of the spring from engagement with the lip when the trigger switch is depressed to a predetermined release position.

11. A side handle for a power tool comprising:
a main gripping body;
a mounting member disposed on one end of the main gripping body and being rotatable relative to the main gripping body;
a rod extending through the main gripping body and the mounting member, the rod having a threaded end extending through the mounting member; and
a knob mounted on an end of the rod opposite the threaded end and being rotatable relative to the main gripping body, the knob being operable to be rotated to fasten the threaded end of the rod to a threaded opening of the power tool,
wherein the mounting member includes a keying feature operable to engage a portion of the power tool to prevent rotation of the mounting member relative to the power tool while the main gripping body is rotated relative to the mounting member.

12. The side handle of claim 11, wherein the main gripping body is rotatable relative to the mounting member within first axial travel distance of the rod, but it is locked relative to the mounting member within a second axial travel distance of the rod.

13. The side handle of claim 11, further comprising a locking interface disposed between the mounting member and the main gripping body.

14. The side handle of claim 13, wherein the locking interface comprises a plurality of teeth disposed on the main gripping body and a corresponding plurality of pockets disposed on the mounting member.

15. The side handle of claim 14, further comprising a trigger switch located on the main gripping body, wherein the locking interface is configured to rotationally lock the main gripping body relative to the mounting member so as to fix an angular orientation of the trigger switch relative to the side handle.

16. A power tool comprising:
a housing having a handle portion, a battery portion provided on a foot of the handle portion for receiving a removeable battery pack, and a motor housing portion extending from the handle portion opposite the battery portion;
an electric motor disposed within the motor housing; and
a gear case that receives an output shaft of the motor from the motor housing, wherein the gear case comprises:
at least one threaded opening disposed through a side wall of the gear case and configured to receive a threaded end of a side handle, and
a keying feature disposed adjacent the threaded opening on the side wall of the gear case and configured to engage a portion of the side handle to prevent rotation of at least frontal portion of the side handle relative to the gear case as the threaded end of the side handle is being rotationally fastened into the threaded opening.

17. The power tool of claim 16, wherein the keying feature includes two planar tabs projecting front the gear case proximate the threaded opening and the portion of the side handle comprises a notch projecting from the frontal end of the side handle, the two planar tabs being positioned to receive the notch therein.

18. The power tool of 17, wherein the gear case further comprises a pin hole disposed adjacent the threaded opening, wherein an electronic switch is mounted inside the gear case in line with the pin hole, and wherein the pin hole is positioned to receive a plunger of the side handle configured to selectively contact with electronic switch.

19. The power tool of claim 16, wherein the keying feature includes an opening through which a first connector is disposed, wherein an electronic switch is mounted inside the side handle and is coupled to a second connector mounted on the front end of the side handle, the second connector being connectable to the first connector.

* * * * *